(12) United States Patent
Hwang et al.

(10) Patent No.: US 8,842,903 B2
(45) Date of Patent: Sep. 23, 2014

(54) SYSTEM AND METHOD FOR GENERATING AND REPRODUCING IMAGE FILE INCLUDING 2D IMAGE AND 3D STEREOSCOPIC IMAGE

(75) Inventors: Seo-Young Hwang, Suwon-si (KR); Gun-Ill Lee, Seoul (KR); Jae-Yeon Song, Seoul (KR); Yong-Tae Kim, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 989 days.

(21) Appl. No.: 12/330,124

(22) Filed: Dec. 8, 2008

(65) Prior Publication Data
US 2009/0148070 A1  Jun. 11, 2009

(30) Foreign Application Priority Data

Dec. 10, 2007 (KR) .................. 10-2007-0127564
Jan. 3, 2008 (KR) .................. 10-2008-0000532
Jan. 14, 2008 (KR) .................. 10-2008-0004086
Feb. 5, 2008 (KR) .................. 10-2008-0012002

(51) Int. Cl.
*H04N 13/00* (2006.01)
*H04N 13/04* (2006.01)
*H04N 19/597* (2014.01)

(52) U.S. Cl.
CPC ....... *H04N 13/0055* (2013.01); *H04N 13/0066* (2013.01); *H04N 13/0454* (2013.01); *H04N 19/00769* (2013.01); *H04N 13/0048* (2013.01)
USPC ...... 382/154; 348/42; 348/469; 348/E13.062; 375/E7.021

(58) Field of Classification Search
None
See application file for complete search history.

(56) References Cited

U.S. PATENT DOCUMENTS

| | | | |
|---|---|---|---|
| 5,596,421 | A | 1/1997 | Shibata et al. |
| 6,141,036 | A | 10/2000 | Katayama et al. |
| 6,614,927 | B1 | 9/2003 | Tabata |
| 6,747,610 | B1 | 6/2004 | Taima et al. |
| 8,045,844 | B2 * | 10/2011 | Sasaki et al. .................. 386/341 |

(Continued)

FOREIGN PATENT DOCUMENTS

| | | |
|---|---|---|
| EP | 0 944 269 A1 | 9/1999 |
| EP | 1 855 488 A1 | 11/2007 |

(Continued)

OTHER PUBLICATIONS

Pereira et al., eds. (2002) The MPEG-4 Book, Chapter 7. Pearson Education, Inc.*

(Continued)

*Primary Examiner* — Barry Drennan
(74) *Attorney, Agent, or Firm* — Jefferson IP Law, LLP

(57) ABSTRACT

An apparatus includes a storage unit to receive and store an image file, a processor to parse a media data field of the image file including one or more image data samples and to parse a media header field including an image type data field indicating whether each of the one or more image data samples is one of 2 dimensional (2D) image data and 3 dimensional (3D) stereoscopic image data to generate an image corresponding to one of a 2D image and a 3D stereoscopic image based on the image type data field of the image file, and a display unit to display the generated image according to the image type data field of the image file.

15 Claims, 18 Drawing Sheets

(56) References Cited

U.S. PATENT DOCUMENTS

| | | | |
|---|---|---|---|
| 8,059,939 B2* | 11/2011 | Sasaki et al. | 386/284 |
| 8,150,240 B2 | 4/2012 | Oshima et al. | |
| 8,659,642 B2 | 2/2014 | Shin et al. | |
| 2003/0108341 A1 | 6/2003 | Oshima et al. | |
| 2004/0120396 A1* | 6/2004 | Yun et al. | 375/240.01 |
| 2005/0088516 A1 | 4/2005 | Song et al. | |
| 2006/0051057 A1* | 3/2006 | Nakagawa | 386/69 |
| 2006/0146208 A1 | 7/2006 | Kim | |
| 2007/0008575 A1* | 1/2007 | Yu et al. | 358/1.15 |
| 2007/0247521 A1 | 10/2007 | Han et al. | |
| 2008/0143895 A1* | 6/2008 | Peterka et al. | 349/15 |
| 2008/0303813 A1* | 12/2008 | Joung et al. | 345/419 |
| 2008/0303893 A1* | 12/2008 | Kim et al. | 348/42 |
| 2009/0066783 A1* | 3/2009 | Lee et al. | 348/43 |
| 2009/0066785 A1* | 3/2009 | Lee | 348/51 |
| 2009/0199100 A1* | 8/2009 | Hwang et al. | 715/723 |
| 2009/0208119 A1* | 8/2009 | Lee et al. | 382/232 |
| 2010/0161686 A1* | 6/2010 | Yun et al. | 707/812 |
| 2010/0171812 A1 | 7/2010 | Kim et al. | |
| 2010/0182403 A1 | 7/2010 | Chun et al. | |
| 2011/0002594 A1* | 1/2011 | Kim et al. | 386/248 |
| 2012/0224025 A1 | 9/2012 | Yu et al. | |

FOREIGN PATENT DOCUMENTS

| | | |
|---|---|---|
| JP | 7-30925 A | 1/1995 |
| JP | 11-191895 A | 7/1999 |
| JP | 2005-094168 A | 4/2005 |
| JP | 2006-323678 A | 11/2006 |
| JP | 2007-295572 A | 11/2007 |
| JP | 2010-530160 A | 9/2010 |
| KR | 10-2005-0094536 A | 9/2005 |
| KR | 10-2006-0130450 A | 12/2006 |
| KR | 10-0716142 B1 | 5/2007 |
| RU | 2 297 730 C1 | 4/2007 |

OTHER PUBLICATIONS

Siragusa et al. (1997) "General purpose stereoscopic data descriptor." VRex, Inc. As archived at the Internet Archive, www.archive.org, as of Aug. 27, 2007.*

* cited by examiner

FIG.2D

SYSTEM AND METHOD FOR GENERATING AND REPRODUCING IMAGE FILE INCLUDING 2D IMAGE AND 3D STEREOSCOPIC IMAGE

PRIORITY

This application claims the benefit under 35 U.S.C. §119 (a) of a Korean patent applications filed in Korea on Dec. 10, 2007 and assigned Application No. 10-2007-0127564, a Korean patent applications filed in Korea on Jan. 3, 2008 and assigned Application No. 10-2008-0000532, a Korean patent applications filed in Korea on Jan. 14, 2008 and assigned Application No. 10-2008-0004086, and a Korean patent applications filed in Korea on Feb. 5, 2008 and assigned Application No. 10-2008-0012002, all of the entire disclosures of which are hereby incorporated by reference.

BACKGROUND OF THE INVENTION

1. Field of the Invention

The present invention relates to a system and a method for generating and reproducing an image file that includes a two-dimensional (2D) image and a three-dimensional (3D) stereoscopic image based on 2D image media standards. More particularly, the present invention relates to a file format capable of alternatively generating and reproducing a 2D image and a 3D stereoscopic image, and a system and a method for alternatively generating and reproducing a 2D image and a 3D stereoscopic image using the file format.

2. Description of the Related Art

File format standards used for storing 2D images are known in the art. In general, the Moving Picture Experts Group (MPEG), which is an international standards organization in the field of multimedia, has published MPEG-2, MPEG-4, MPEG-7 and MPEG-21 standards, since its first standardization of MPEG-1 in 1988. Because a variety of standards have been developed, a need to generate one profile by combining different standard technologies has arisen. In response to this need, MPEG-A (MPEG Application: ISO/ICE 230000) multimedia application standardization activities have been carried out for storing and reproducing 2D images.

However, to date, a file format for storing a 3D stereoscopic image has not yet been standardized. Furthermore, a file format structure that includes both 2D and 3D stereoscopic images in a general portable terminal, or a system and a method for generating and reproducing such images using the structure of such file format has not yet been realized. This is important because when generating an image file in the form of a 3D stereoscopic image, a user cannot help but watch a non-3D stereoscopic image in the image file as a 3D stereoscopic image, so as to cause eyestrain on the user. Here, for example, such image may be an image in which the entire image is configured with characters.

SUMMARY OF THE INVENTION

An aspect of the present invention is to address at least the above-mentioned problems and/or disadvantages and to provide at least the advantages described below. Accordingly, an aspect of the present invention is to provide a file format for generating, storing, and reproducing a 3D stereoscopic image.

Another aspect of the present invention is to provide a file format for a 3D stereoscopic image based on a file format used to generate, store, and reproduce an existing 2D image.

Yet another aspect of the present invention is to provide a system and a method for generating and reproducing a 3D stereoscopic image file by using a file format for a 3D stereoscopic image.

In particular, the present invention provides a file format that includes both 3D stereoscopic image and 2D image so that the user can watch the 3D stereoscopic image and 2D image according to the file format. A file format in accordance with the present invention provides for storing both 2D and 3D stereoscopic images within one image file. For instance, a 3D stereoscopic image may be generally provided within one 3D stereoscopic image for news contents, for example, and the 2D image may be provided in the image including only a caption, so as to provide the user with convenience.

In accordance with an aspect of the present invention, an apparatus includes a storage unit to receive and store an image file, a processor to parse a media data field of the image file including one or more image data samples and to parse a media header field including an image type data field indicating whether each of the one or more image data samples is one of 2 dimensional (2D) image data and 3 dimensional (3D) stereoscopic image data to generate an image corresponding to one of a 2D image and a 3D stereoscopic image based on the image type data field of the image file, and a display unit to display the generated image according to the image type data field of the image file.

In accordance with another aspect of the present invention, a computer-implemented method includes receiving an image file, parsing a media data field of the image file including one or more image data samples, parsing a media header field including an image type data field indicating whether each of the one or more image data samples is one of 2 dimensional (2D) image data and 3 dimensional (3D) stereoscopic image data, and generating an image corresponding to one of a 2D image and a 3D stereoscopic image based on the image type data field of the image file.

In accordance with yet another aspect of the present invention, a computer readable medium having stored thereon a data structure includes a media data field including one or more image data samples, and a media header field including an image type data field indicating whether each of the one or more image data samples is one of 2 dimensional (2D) image data and 3 dimensional (3D) stereoscopic image data.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features and advantages of certain exemplary embodiments of the present invention will be more apparent from the following description taken in conjunction with the accompanying drawings, in which:

FIG. 2D is a block diagram illustrating a storage format of an image file according to another exemplary embodiment of the present invention;

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the invention as defined by the claims and their equivalents. It includes various details to assist in that understanding but these are to be regarded as merely exemplary. Accordingly, those of ordinary skill in the art will recognize that various changes and modifications of the embodiments described herein can be made without departing from the scope and spirit of the invention.

Figure 1:
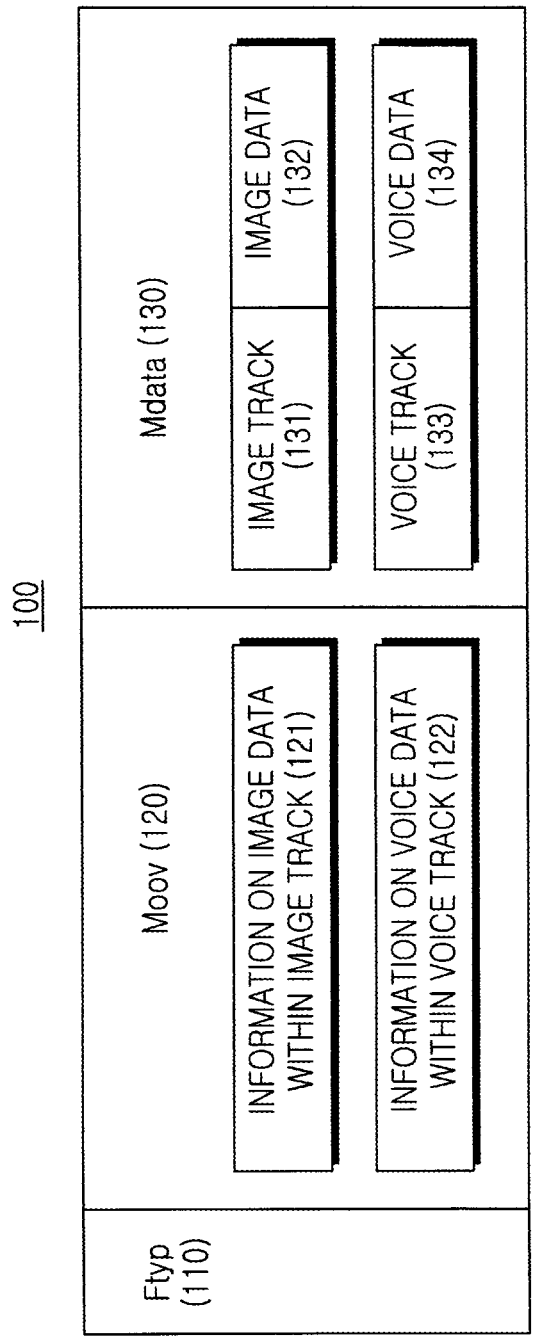
FIG. 1 is a block diagram illustrating a storage format of a 2D image file according to prior art.

Before describing a format for storing a three-dimensional (3D) stereoscopic image according to an exemplary embodiment of the present invention, a storage format of a two-dimensional (2D) image file based on a conventional International Standards Organization (ISO) standard will be described. FIG. 1 is a diagram illustrating a file format of a 2D image based on the conventional ISO 14496-12 standard. Referring to FIG. 1, the 2D image file format 100 includes a file area ftyp 110 of a top level, a moov area 120, and an mdat area 130. The mdat area 130 is a data area of the file format and includes actual image data 132 within an image track 131 and voice data 134 within a voice track 133. Each of the tracks includes respective image data and voice data stored in a frame unit.

The moov area 120 corresponds to a header area of the file format and has an object based structure. The moov area 120 includes all pieces of information needed to reproduce a file, including content information (e.g., a frame rate, a bit rate, image size, etc.) and synchronization information used to support a reproduction function of fast-forward/rewind (FF/REW). In particular, the moov area 120 includes information, such as the number of frames within the image data and voice data, a size of each frame, etc., thereby making it possible to restore and reproduce image data and voice data by parsing the moov area 120 during reproduction.

Unlike the prior art, exemplary embodiments of the present invention include a storage format of an image file that provides for both 2D and 3D stereoscopic images, and a system for generating and reproducing image files using the storage format of the present invention. In particular, exemplary embodiments of the present invention are characterized in that each part of the image file may be implemented in the form of a 2D image or 3D stereoscopic image according to the characteristics of the content. For example, in sections that include many characters, displaying the section as a 3D stereoscopic image causes eyestrain on the user. Therefore, the section is stored and reproduced as a 2D image. The part requiring rhythmical movement or three-dimensional effect is stored and reproduced as a 3D stereoscopic image. Accordingly, the format of the image file appropriate for the characteristic of the contents is implemented.

Hereinafter, a storage format of the image file adapted to include 2D images and 3D stereoscopic images according to an exemplary embodiment of the present invention will be described with reference to FIGS. 2A and 2B. As mentioned above, according to exemplary embodiments of the present invention, image files 201 and 202 including the 2D image and the 3D stereoscopic image include a box (i.e., field) with information on the image file regarding the 2D image and the 3D stereoscopic image.

In accordance with the present invention, the box including information on the image file regarding the 2D image file and the 3D stereoscopic image may be inserted into a file area, moov area, or track area directly or as part of a meta box, or may be inserted into a sample table box (e.g., "stbl" box) that includes information of a sample in the track area. The sample refers to a basic unit for dividing the image within the file format, such as a frame.

Figure 2A:
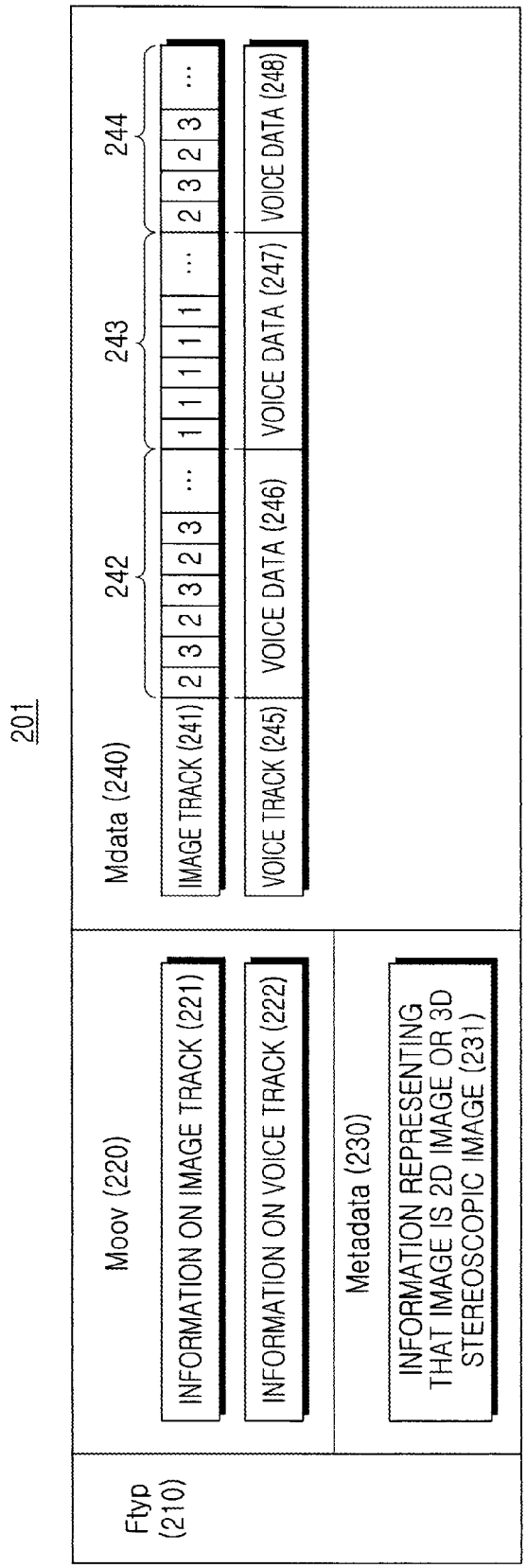
FIG. 2A is a block diagram illustrating a storage format of an image file according to an exemplary embodiment of the present invention.

FIG. 2A illustrates a storage format of an image file in which 3D stereoscopic image file is included in one image stream. As shown in FIG. 2A, data structure 201 of the image file includes a top level file area Ftyp 210, Moov area 220 corresponding to a header area, an Mdata area 240 corresponding to a data area, and a Metadata area 230. Here, the Mdata area 240 includes an image track 241 and a voice track 245 where image data is stored in the image track 241 and voice data is stored in the voice track 245. The image track 241 includes first image data for a 2D image (denoted as "1") and second and third image data for a 3D stereoscopic image (denoted as "2" and "3"). Here, the second image data and the third image data may be left view image data and right view image data of a single subject, respectively. For example, if the left view and right view image data representing a single subject photographed from a left view and a right view are interleaved and displayed, a user can see a three-dimensional effect.

FIG. 2A illustrates an example in which each fragment 242, 243, and 244 includes data samples of 3D stereoscopic image data, 2D image data, and 3D stereoscopic image data, respectively. The sequence of the image data is defined as 2D image or 3D stereoscopic image according to the characteristic of each part of a particular content. Further, if a storage scheme of the second image data and the third image data of a 3D stereoscopic image stored in the fragments 242 and 244 is predetermined in accordance with the present invention, the image file can be generated and reproduced in any manner desired. For example, FIG. 2A shows an example of a method in which the 3D stereoscopic image fragments 242 and 244 include each second image data (i.e., sample 2) and the third image data (i.e., sample 3) alternatively stored where each sample is a frame unit. Alternatively, there may be a scheme in which the second image data and the third image data are stored side-by-side as a frame unit, or the image data may be divided into small data to be stored in an interleaving manner as a frame unit.

The voice data 246, 247, and 248 included in the voice track 245 are the voice data for each fragment 242, 243, and 244, respectively. The voice data are synchronized with the image data of the fragments 242, 243, and 244 to be reproduced.

The Moov area 220 corresponds to the header area of the data structure and includes information 221 regarding the image track and information 222 regarding the voice track. The information 221 regarding the image track includes general information used to reproduce a file including content information, such as a frame rate, a bit rate, image size, etc., and synchronization information used to support a reproduction function, such as fast-forward/rewind (FF/REW). In particular, the Moov area 220 includes information, such as the total number of frames of the image data within the image track 241 and voice data within the voice track 245, size of each frame, etc. Therefore, it is possible to restore and reproduce image data and voice data by parsing the Moov area 220 during reproduction.

The present invention includes a box including identification information indicating if each frame generated by the first image data, second image data, and third image data is for a 2D image or a 3D stereoscopic image. As shown in FIG. 2A, the Moov area 230 includes a box 231 that represents if each image data stored in the frame unit within the image file includes image data for a 2D image or image data for a 3D stereoscopic image. In an exemplary embodiment, a flag may be assigned to each frame and set so as to represent the image characteristic of the frame. The identification information includes, for example, information on the number of fragments containing sequential frames for a 2D image and for a 3D stereoscopic image. Accordingly, the image file can be restored and reproduced in the form of a 2D image or 3D stereoscopic image using such information. The description of the restoration and reproduction of the image file in the form of a 2D image or 3D stereoscopic image is exemplified in Tables 1 and 2 below.

TABLE 1

| Frame No. | | | | | | | |
|---|---|---|---|---|---|---|---|
| | 1 | ... | 300 | 301 | ... | 500 | 501 | ... | 900 |
| Type | 3D stereoscopic image | | | 2D image | | | 3D stereoscopic image | | |
| Stereo_Flag | 1 | ... | 1 | 0 | ... | 0 | 1 | ... | 1 |

TABLE 2

| Entry_Count = 3 | |
|---|---|
| Sample_Count | Stereo_Flag |
| 300 | 1 |
| 200 | 0 |
| 400 | 1 |

As shown in Tables 1 and 2, and FIG. 2A, the first fragment 242 includes the second image data and the third image data for the 3D stereoscopic image, the second fragment 243 includes the first image data for the 2D image, and the third fragment 244 includes the second image data and the third image data for the 3D stereoscopic image. Here, the identification information 231 indicates the sample_count and the flag shown in Table 2. Accordingly, the image stored in the fragments 242, 243, and 244 can be restored and reproduced by referring to information 231 indicating whether the stored image in the data structure 201 is a 2D image or a 3D stereoscopic image. The identification information includes information for decoding the second image data and the third image data and information for synthesizing the second image data and the third image data, and the information 231 is referenced during reproduction.

Another exemplary embodiment of the present invention will be described with reference to FIG. 2B. FIG. 2B is a block diagram illustrating a storage format of a 3D stereoscopic image file according to another exemplary embodiment of the present invention. In the exemplary embodiment shown in FIG. 2B, there are two of image tracks rather than one image track as shown in FIG. 2A. Data structure 202 of the 3D stereoscopic image file includes a top level file area Ftyp 250, a Moov area 260 corresponding to the header area, an Mdata area 280 corresponding to the data area, and a Metadata area 270. Those descriptions that are substantially the same as that of FIG. 2A are not repeated for conciseness.

Briefly, information 261 and 262 on a first image track and a second image track, and information 263 on a voice track are substantially the same as information 221 and 222 of FIG. 2A, fragments 293, 294, and 295 are substantially the same as the fragments 242, 243 and 244, voice track 289 including voice data 290, 291, and 292 is substantially the same as voice track 245 including voice data 246, 247 and 248, and information 272 is substantially the same as the information 231. A first image track 281 includes second image data 282 and 284 corresponding to an image from one viewing angle (e.g., a left view image) and first image data 283 corresponding to a 2D image. A second image track 285 includes third image data 286 and 288 corresponding to an image from a different viewing angle (e.g., a right view image) and first image data 287 corresponding to a 2D image. That is, the left view image data and the right view image data are stored in different image tracks, respectively, and the first image data 283 and the first image data 287 correspond to an identical image. Accordingly, identification information 272 indicating that the image is a 2D image or a 3D stereoscopic image also includes information on which of the two 2D image data (i.e., between the first image data 283 and first image data 287) is to be used for the 2D image, in addition to the afore-mentioned information. That is, the image data to be used for the 2D image can be determined according to information on which image track between the first image track 281 and the second image track 285 is set as a main image track.

Table 3 represents an information box serving as a standard for the storage format of the image file including a 2D image and a 3D stereoscopic image in accordance with the present invention. The standards are generally defined in compliance with ISO/IEC 14496-12 ISO base media format.

TABLE 3

[Definition]
Box Type: 'svmi'
Container: Meta Box('meta') or Sample Table Box ('stbl')
Mandatory: Yes
Quantity: Exactly on
[Syntax]
aligned(8) class StereoscopicVideoInformationBox extends FullBox('svmi', version = 0, 0)
{
   //stereoscopic visual type information
   unsigned int(8) stereoscopic_composition_type;
   unsigned int(1) is_left_first;
   unsigned int(7) reserved;
   // stereoscopic fragment information
   unsigned int(1) is_all_stereo;
   unsigned int(7) reserved;
   if(is_all_stereo == 0)
   {
     unsigned int(1) is_main_media;
     unsigned int(7) reserved;
     unsigned int(32) entry_count;
     for(i=0; i<entry_count; i++)
     {
       unsigned int(32) sample_count;
       unsigned int(8) stereo_flag;
     }
   }
}
[Semantics]
stereoscopic_composition_type: construction form of the frame of stereoscopic video contents (0: side-by-side, 1: vertical line interleaved, 2: frame sequentialial, 3: monoscopic left image, 4: monoscopic right image)
is_left_first: represent which one between the left image and the right image is first encoded
is_all_stereo: represent that fragment within ES is all stereo fragments (0: mono, 1:stereo)
is_main_media: represent that monoscopic contents within ES is a main media (0: sub media, 1: main media)
entry_count: the number of fragments including the sample having the sequential values
sample_count: the number of samples having the sequential values
stereo_flag: represent that the current frame is stereo or mono (0: mono, 1:stereo)

The image information box (e.g., "svmi" box) may be a box storing stereo/mono information on each sample included in the image file (ES). Accordingly, the container including the image information box (e.g., "svmi" box) may be the meta box or sample table box (e.g., "stbl" box). A container refers to a higher level of box including the current box. Therefore, the container including the image information box (e.g., "svmi" box) may be the Metadata area 270 as shown in FIG. 2B and Table 4A shown below, and also may be included in the sample table box (e.g., "stbl" box) as shown in Table 4B below. Accordingly, the parts newly added in the container are represented in Tables 3, 6, 8, and 9, shown below. According to the present invention, the container including the image information box (e.g., "svmi" box) refers to the meta box or sample table box (e.g., "stbl" box). However, it is to be understood that it may be moved freely to a more appropriate location of any one of the table of boxes on ISO/IEC 14496-12 ISO base media file format.

TABLE 4A

| meta | | metadata |
| | hdlr | handler |

TABLE 4A-continued

| dinf | | | data information box |
| | dref | | dta reference box |
| ipmc | | | IPMP control box |
| iloc | | | item location |
| ipro | | | item protection |
| | sinf | | protection scheme information box |
| | | frma | original format box |
| | | imif | IPMP information box |
| | | schm | scheme type box |
| | | schi | scheme information box |
| linf | | | item information |
| xml | | | XML container |
| bxml | | | binary XML container |
| pitm | | | primary item reference |
| svmi | | | stereoscopic video media information box |

Table 4B represents the table of boxes in which the image information box (e.g., "svmi" box) may be inserted into a sub "stbl" box container, for example, in the file structure of ISO/IEC 23000-11 stereoscopic video application format. Further, every image information box (e.g., "svmi" box) according to an exemplary embodiment of the present invention may be included in the file area, moov area, or track area.

TABLE 4B

| Ftyp | | | | file type and compatibility |
| pdin | | | | Progressive download Information |
| moov | | | | container for all the metadata |
| | mvhd | | | movie header, overall declarations |
| | trak | | | container for an individual track or stream |
| | | tkhd | | track header, overall information about the track |
| | | tref | | track reference container |

TABLE 4B-continued

| | | | | |
|---|---|---|---|---|
| | edts | | | edit list container |
| | | elst | | an edit list |
| | mdia | | | container for the media information in a track |
| | | mdhd | | media header, overall information about the media |
| | | hdlr | | handler, declares the media (handler) type |
| | | minf | | media information container |
| | | | vmhd | video media header, overall information (video track only) |
| | | | smhd | sound media header, overall information (sound track only) |
| | | | hmhd | hint media header, overall information (hint track only) |
| | | | nmhd | Null media header, overall information (some tracks only) |
| | | | dinf | data information box, container |
| | | |   dref | data reference box, declares soure(s) of media data in track |
| | | | stbl | sample table box, container for the time/space map |
| | | |   stsd | sample descriptions (codec types, initialization etc.) |
| | | |   stts | (decoding) time-to-sample |
| | | |   stsc | sample-to-chunk, partial data-offset information |
| | | |   stsz | sample sizes (framing) |
| | | |   stz2 | compact sample sizes (framing) |
| | | |   stco | chunk offset, partial data-offset information |
| | | |   co64 | 64-bit chunk offset |
| | | |   stss | sync sample table (random access point) |
| | | |   svmi | stereoscopic video media infomration |
| | ipmc | | | IPMP Control Box |
| mdat | | | | media data container |
| meta | | | | metadata |
| | hdlr | | | handler, declares the metadata (handler) type |
| | iloc | | | item location |
| | iinf | | | item information |
| | xml | | | XML container |
| | bxml | | | binary XML container |
| | scdi | | | stereoscopic camera and display information |

FIGS. 2B to 2F illustrate a storage format of an image file according to various exemplary embodiments of the present invention.

Figure 2B:
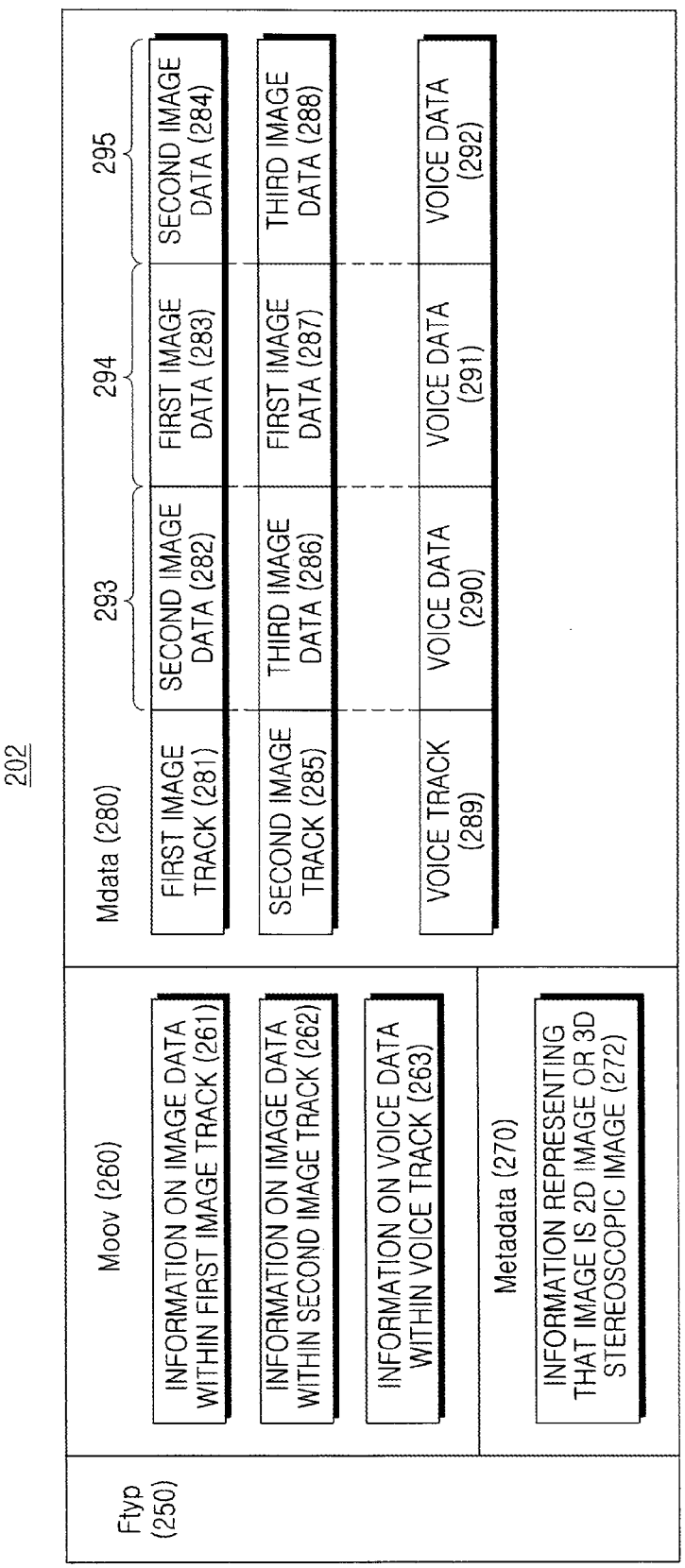
FIG. 2B is a block diagram illustrating a storage format of an image file according to another exemplary embodiment of the present invention.

FIG. 2B illustrates a storage format of an image file in the case where a 3D stereoscopic image file includes two image streams (e.g., a left image and a right image stored in separate image streams) in which a box containing the information of the 2D image and the 3D stereoscopic image according to the present invention is added to a moov area (i.e., Moov 260).

Figure 2C:
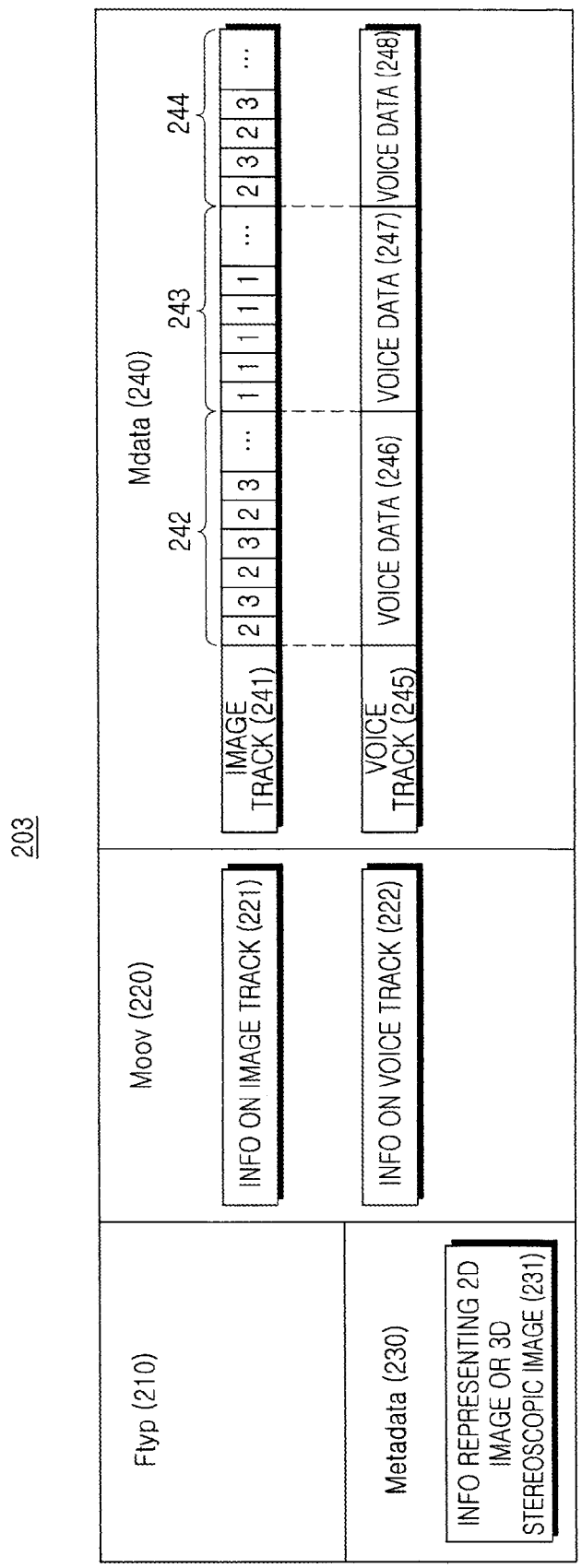
FIG. 2C is a block diagram illustrating a storage format of an image file according to another exemplary embodiment of the present invention.

FIG. 2C illustrates a storage format of an image file in the case where a 3D stereoscopic image file includes one image stream in which a box containing the information of the 2D image and the 3D stereoscopic image according to the present invention is added to a file area (i.e., Ftyp 210).

Figure 2D:
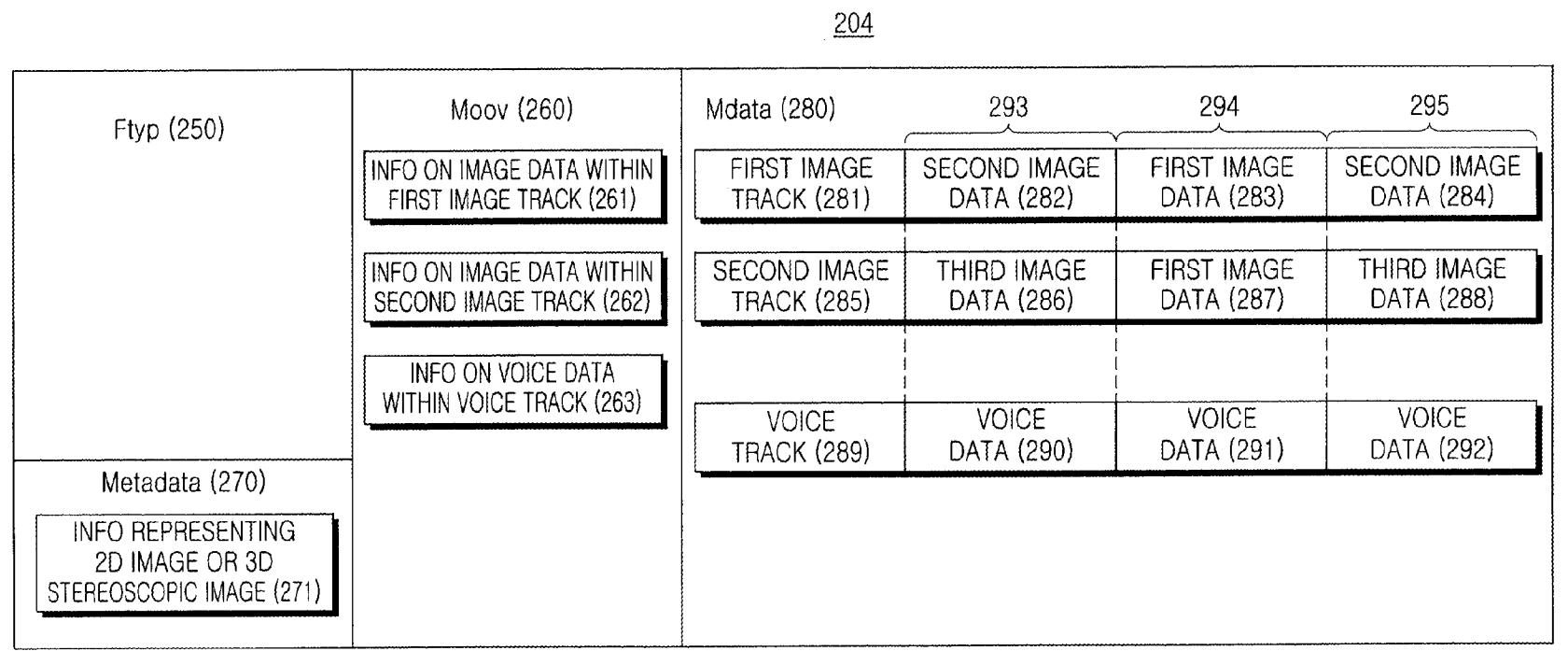

FIG. 2D illustrates a storage format of an image file in the case where a 3D stereoscopic image file includes two image streams (i.e. a left image and a right image is stored in separate image streams) in which a box containing the information of the 2D image and the 3D stereoscopic image according to the present invention is added to a file area (i.e., Ftyp 250).

Figure 2E:
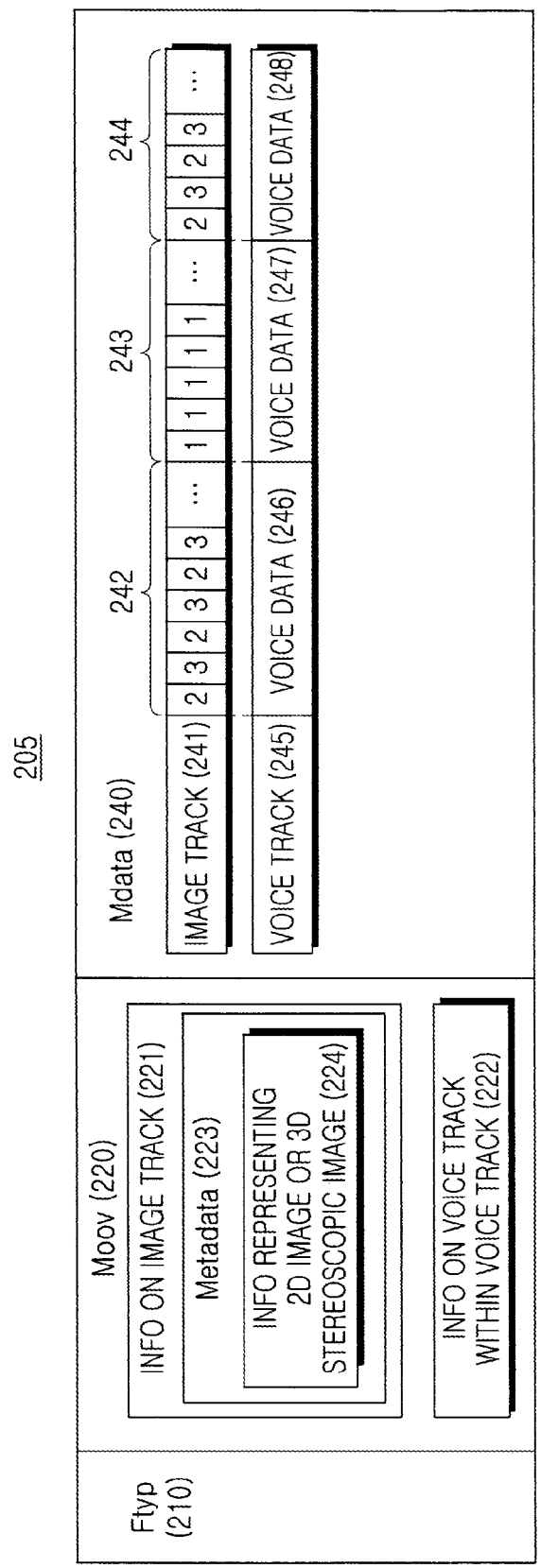
FIG. 2E is a block diagram illustrating a storage format of an image file according to another exemplary embodiment of the present invention.

FIG. 2E illustrates a storage format of an image file in the case where a 3D stereoscopic image file includes one image stream in which a box containing the information of the 2D image and the 3D stereoscopic image according to the present invention is added to a track area (i.e., Track 221).

Figure 2F:
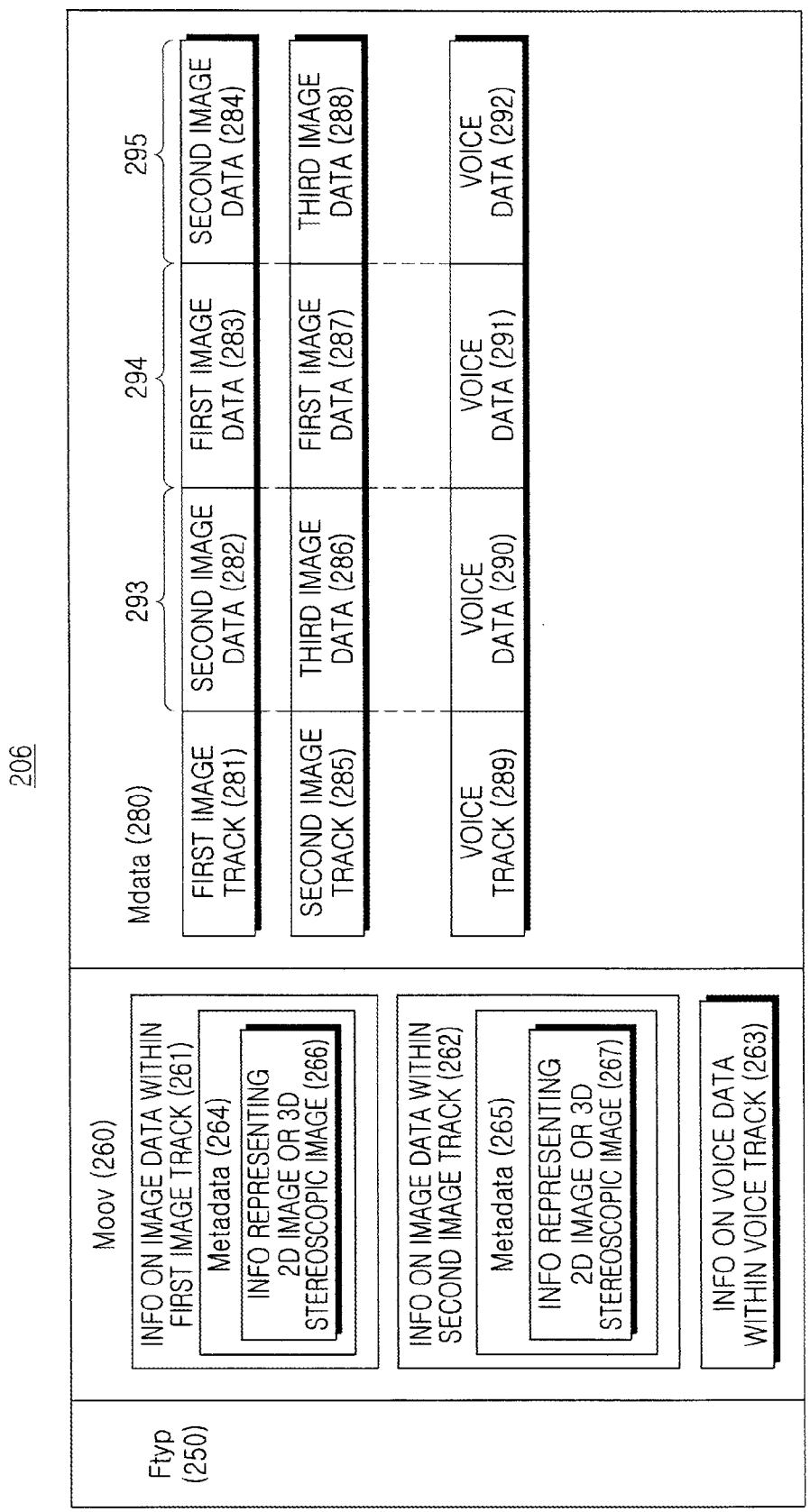
FIG. 2F is a block diagram illustrating a storage format of an image file according to another exemplary embodiment of the present invention.

FIG. 2F illustrates a storage format of an image file in the case where a 3D stereoscopic image file includes two image streams (i.e. a left image and a right image is stored in separate image streams) in which a box containing the information of the 2D image and the 3D stereoscopic image according to the present invention is added to a respective track area (i.e., Track 261 and Track 262).

FIGS. 2A to 2F illustrate exemplary embodiments of the present application in which the image information box (e.g., "svmi" box) including the information on the image file that contains both 2D image and 3D stereoscopic image is included in a meta box, so as to be inserted into the file area, moov area, and track area.

Figure 2G:
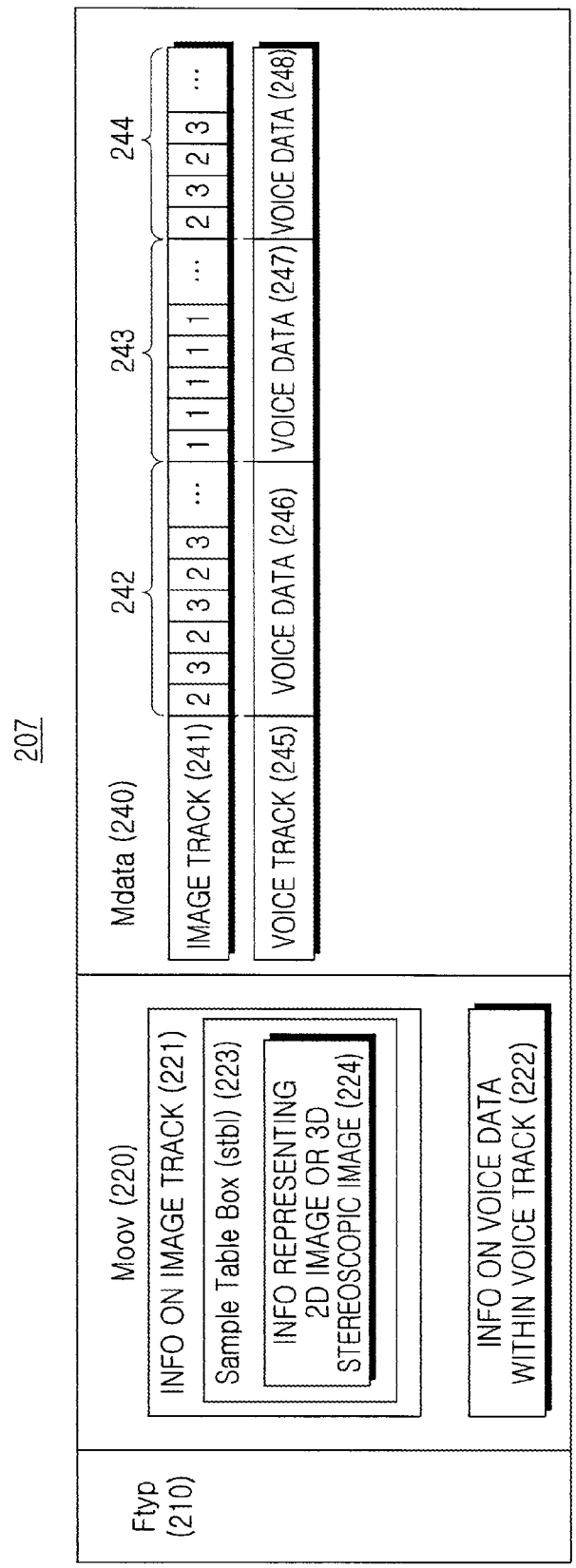
FIG. 2G is a block diagram illustrating a storage format of an image file according to another exemplary embodiment of the present invention.
Figure 2H:
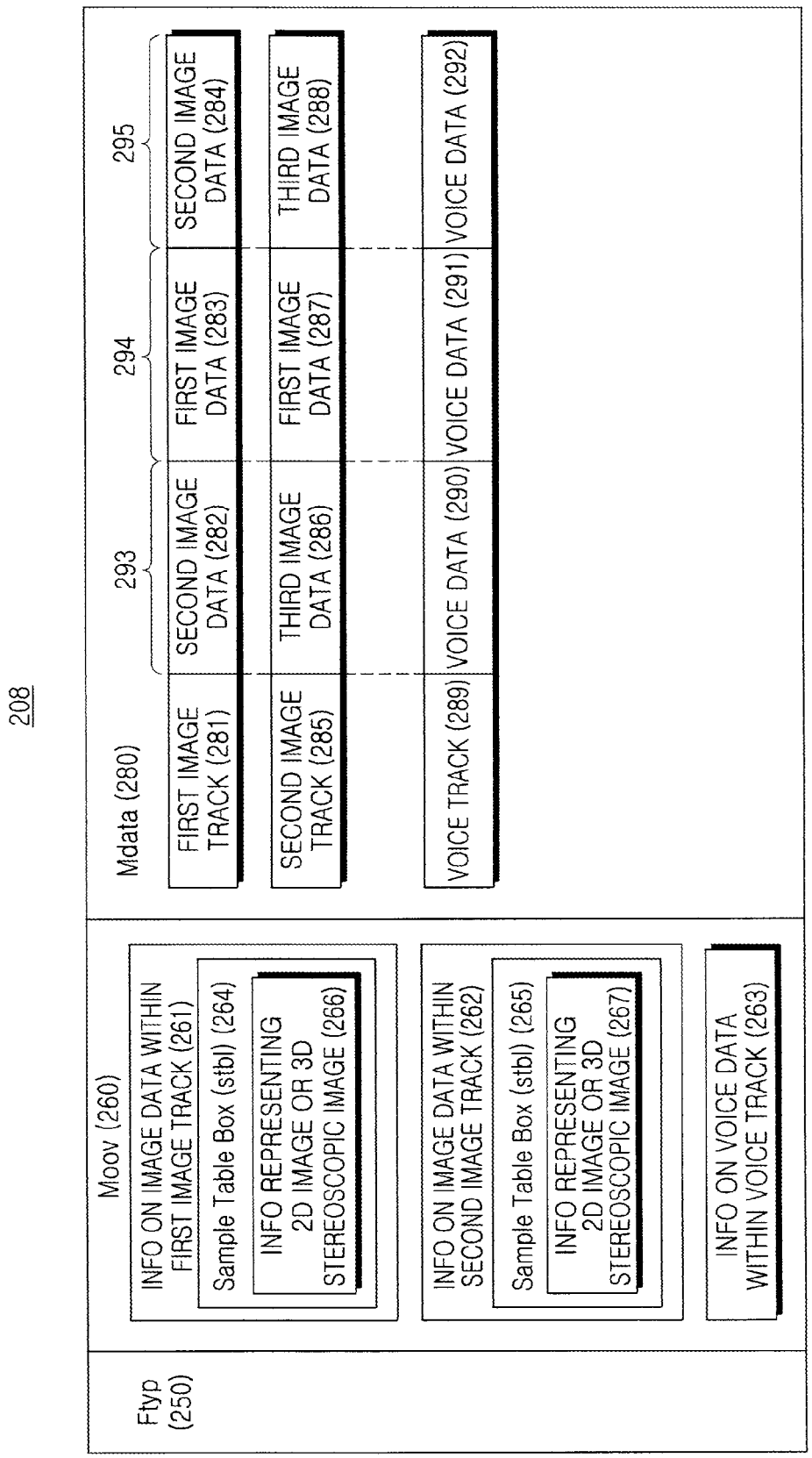
FIG. 2H is a block diagram illustrating a storage format of an image file according to another exemplary embodiment of the present invention.

FIGS. 2G and 2H illustrate exemplary embodiments in which an image information box (e.g., "svmi" box) including information on an image file that contains both 2D image and 3D stereoscopic image is inserted into a sample table box (e.g., "stbl" box) that includes sample information of the image file in a track area. For purposes of explanation, a sample refers to a basic unit for dividing the image within the file format, such as a frame).

FIG. 2G illustrates a storage format of an image file in the case where a 3D stereoscopic image file includes one image stream in which a box containing the information of the 2D image and the 3D stereoscopic image according to the present invention is added to a sample stable box (e.g., "stbl" box).

FIG. 2H illustrates a storage format of an image file in the case where a 3D stereoscopic image file includes two image streams (i.e. a left image and a right image is stored in separate image streams) in which a box containing the information of the 2D image and the 3D stereoscopic image according to the present invention is added to a sample stable box (e.g., "stbl" box).

As illustrated in FIGS. 2A to 2H, the image information box (e.g., "svmi" box) may be added to the file level and track level of the existing image file format, not to the moov level, so that the image file can be generated by the various image file formats.

Hereinafter, alternative exemplary embodiments of the present invention different from the exemplary embodiment of Tables 2 and 3, and a newly modified image information box (e.g., "svmi" box) will be introduced.

In an exemplary embodiment in the case where the contents include both 2D image and 3D stereoscopic image, syntax and semantics of the modified image information box are described as shown in Table 6.

TABLE 5

|  | S1 (stereo) | S2 (stereo) | S3 (stereo) | M1 (mono) | M2 (mono) | S4 (stereo) |
|---|---|---|---|---|---|---|
| Number of frames | 100 | 100 | 100 | 200 | 300 | 100 |

TABLE 6

[Definition]
Box Type: 'svmi'
Container: Meta Box('meta') or Sample Table Box ('stbl')
Mandatory: Yes
Quantity: Exactly one
[Syntax]
aligned(8) class StereoscopicVideoInformationBox extends FullBox('svmi', version = 0, 0)
{
  //stereoscopic visual type information
  unsigned int(8) stereoscopic_composition_type;
  unsigned int(1) is_left_first;
  unsigned int(7) reserved;
  // stereoscopic fragment information
  unsigned int(32) entry_count;
  for(i=0; i<entry_count; i++)
  {
    unsigned int(32) sample_count;
    unsigned int(1) stereo_flag;
    unsigned int(7) reserved;
    unsigned int(32) item_count;
  }
}
[Semantics]
stereoscopic_composition_type: frame composition type of stereoscopic video contents (0: side-by-side, 1: vertical line interleaved, 2: frame sequential, 3: monoscopic left image, 4: monoscopic right image)
  is_left_first: represents which one between the left image and right image is first encoded
  entry_count: the number of fragments in which the type of the fragment is shifted from stereo to mono or from mono to stereo
  sample_count: the number of samples having sequential values
  stereo_flag: represents if the current frame is stereo or mono (0: mono, 1: stereo)
item_count: the number of fragments included in the entry

TABLE 7

| Entry_Count = 3 | | |
|---|---|---|
| Sample_Count | Stereo_Flag | Item_Count |
| 300 | 1 | 3 |
| 500 | 0 | 2 |
| 100 | 1 | 1 |

If the entry_count is defined as the semantics of Table 3, there is a problem of failing to recognize the fragment construction within the current entry. Accordingly, in an exemplary embodiment, the syntax_value of the item_count is included so as to solve the above problem. That is, when the entry_count is defined according to the semantics of Table 6, only if the contents include the flag value discriminating that The contents of Table 5 using the syntax of Table 6 is represented as Table 7.

stereo is first or mono is first, the stereo_flag syntax can be omitted, which is defined as follows.

TABLE 8

[Definition]
Box Type: 'svmi'
Container: Meta Box('meta') or Sample Table Box ('stbl')
Mandatory: Yes
Quantity: Exactly one
[Syntax]
aligned(8) class StereoscopicVideoInformationBox extends FullBox('svmi', version = 0, 0)
{
  //stereoscopic visual type information
  unsigned int(8) stereoscopic_composition_type;
  unsigned int(1) is_left_first;
  unsigned int(7) reserved;
  // stereoscopic fragment information
  unsigned int(32) entry_count;
  unsigned int(1) is_stereo_first;
  unsigned int(7) reserved;

TABLE 8-continued

```
    for(i=0; i<entry_count; i++)
    {
        unsigned int(32) sample_count;
        unsigned int(32) item_count;
    }
}
[Semantics]
    stereoscopic_composition_type: frame composition type of stereoscopic video contents (0:
side-by-side, 1: vertical line interleaved, 2: frame sequential, 3: monoscopic left image, 4:
monoscopic right image)
    is_left_first: represent which one between the left image and the right image is first
encoded
    entry_count: the number of fragments in which the type of the fragment is shifted from
stereo to mono or from mono to stereo
    is_stereo_flag: represents which type of image is first showed in the contents mixed with
stereo and mono (0: mono first, 1: stereo first)
    sample_count: the number of samples having sequential values
item_count: the number of fragments included in the entry
```

If the value of the image sequence information (is_stereo_first) is 1, the contents is constructed in a sequence of S→M→S→M→ . . . , where "S" is stereo and "M" is mono, and if the value of image sequence information (is_stereo_first) is 0, the contents is constructed in a sequence of M→S→M→S→ . . . .

In yet another exemplary embodiment, the sample_count syntax is excluded. In this case, it can be recognized whether each fragment is stereo or mono but fails to recognize how many number of frames is stereo or mono. Therefore, the number of stereo or mono frames can be determined using the values of the syntax of an item location box defined on the ISO media file format and the syntax of the sub-boxes of the sample table box (e.g., "stbl" box).

Therefore, random access to a predetermined location is more effectively accomplished using those values.

Next, an exemplary system for generating and reproducing image files using data structures 201 to 208 of the image files shown in FIGS. 2A to 2H will be described. The system generally includes an image file generating apparatus and an image file reproducing apparatus. First, the image file generating apparatus according to an exemplary embodiment of the present invention will be described with reference to FIG. 3.

Figure 3:
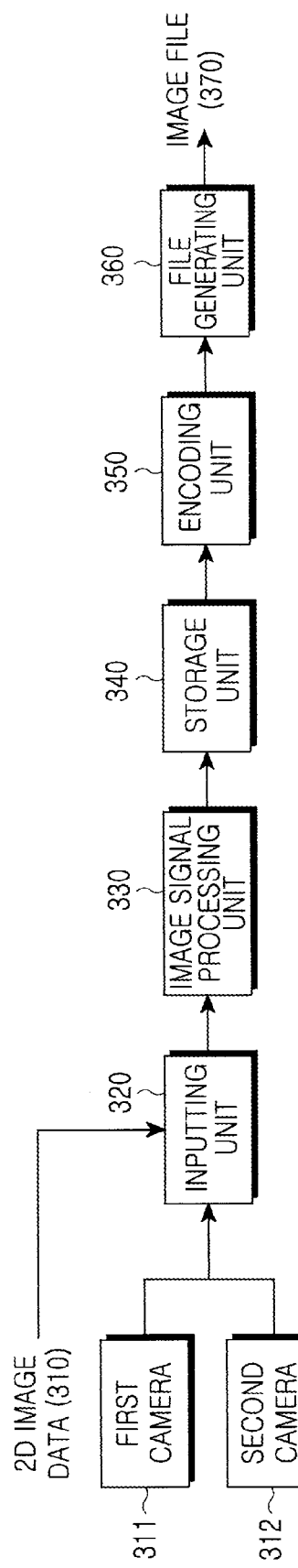
FIG. 3 is a block diagram illustrating an image file generating apparatus according to an exemplary embodiment of the present invention.

As shown in FIG. 3, an image file generating apparatus according to the present invention includes a first camera 311, a second camera 312, an input unit 320, an image signal processing unit 330, a storage unit 340, an encoding unit 350, and a file generating unit 360. The first camera 311 photo-

TABLE 9

```
[Definition]
Box Type: 'svmi'
Container: Meta Box('meta') or Sample Table Box ('stbl')
Mandatory: Yes
Quantity: Exactly one
[Syntax]
aligned(8) class StereoscopicVideoInformationBox extends FullBox('svmi', version = 0, 0)
{
    //stereoscopic visual type information
    unsigned int(8) stereoscopic_composition_type;
    unsigned int(1) is_left_first;
    unsigned int(7) reserved;
    // stereoscopic fragment information
    unsigned int(32) entry_count;
    for(i=0; i<entry_count; i++)
    {
        unsigned int(1) stereo_flag;
        unsigned int(1) reserved;
    }
}
[Semantics]
    stereoscopic_composition_type: frame composition type of stereoscopic video contents (0:
side-by-side, 1: vertical line interleaved, 2: frame sequential, 3: monoscopic left image, 4:
monoscopic right image)
    is_left_first: represents which one between the left image and right image is first encoded
    entry_count: the number of fragments within ES
stereo_flag: represents if the current frame is stereo or mono (0: mono, 1: stereo)
```

Further, when a terminal performs random access to the contents, it is shifted to a desired location while sequentially reading the size of frame from the beginning using the values of the sample size box (e.g., "stsz" box). If the sample_count syntax value of the image information box (e.g., "svmi" box) defined in the present invention is used, the number of frames of each fragment and start address and size of each fragment in the item location box (e.g., "iloc" box) can be recognized.

graphs a subject from a left view or a right view and then outputs second image data. The second camera 312 photographs the subject from a view different from that of the first camera 311 and then outputs third image data. It is to be understood that multiple views from different angles may be used without departing from the scope of the present invention. Then, first image data 310 for the 2D image is input together with the second image data and the third image data through the input unit 320.

The first image data, the second image data, and the third image data are pre-processed by the image signal processing unit 330. Here, the pre-processing operation includes conversion of an analog external image value, i.e., analog values of light and color components generated by a charge coupled device (CCD) or a complimentary metal-oxide semiconductor (CMOS) type sensor, for example, into a digital value.

The storage unit 340 stores the first image data, the second image data, and the third image data pre-processed by the image signal processing unit 330, and provides the stored image data to the encoding unit 350. FIG. 3 shows the storage unit 340, but it does not separately show a storage construction for buffering between the elements shown in FIG. 3 that may be included. The encoding unit 350 encodes the first image data, the second image data, and the third image data from the storage unit 340. The encoding operation performed by the encoding unit 350 is the encoding of data, which can be skipped as occasion demands.

The file generating unit 360 generates an image file 370 by using the first image data, the second image data, and the third image data encoded by the encoding unit 350. In this case, the first image data, the second image data, and the third image data are stored in the data area (e.g., the mdata area) and information used to generate the first image data (i.e., 2D image) and the second image data and the third image data (i.e., 3D stereoscopic image) is stored in the header are (e.g., the moov area and the metadata area). The generated image file 370 is input and transmitted to the stereoscopic image file reproducing apparatus, and then the image file reproducing apparatus generates and reproduces the 2D image and the 3D stereoscopic image from the image file 370. Hereinafter, an exemplary image file reproducing apparatus will be described.

Figure 4:
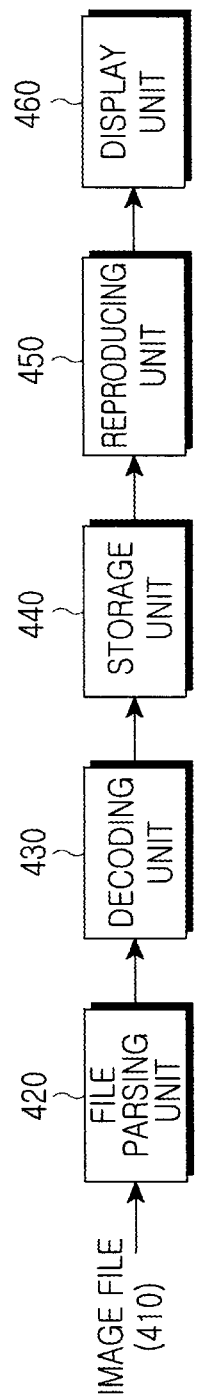
FIG. 4 is a block diagram illustrating an image file reproducing apparatus according to an exemplary embodiment of the present invention.

FIG. 4 is a block diagram illustrating an image file reproducing apparatus according to an exemplary embodiment of the present invention. As shown in FIG. 4, the image file reproducing apparatus includes a file parsing unit 420, a decoding unit 430, a storage unit 440, a reproducing unit 450, and a display unit 460.

The file parsing unit 420 receives and parses the image file 410 (e.g., image file 370 from FIG. 3) generated by the file generating unit 360 of the image file generating apparatus, for example. In this case, the file parsing unit 420 parses information stored respectively in the moov area and the metadata area and then extracts the first image data, the second image data, and the third image data stored in the mdata area.

The decoding unit 430 decodes the extracted first image data, second image data, and third image data. In an exemplary embodiment, the decoding is performed in the case where the image file generating apparatus encodes the data using the encoding unit 350. That is, if the encoding is skipped by the file generating apparatus, the decoding is skipped by the file reproducing apparatus. Then, the decoded data are stored in the storage unit 440.

The reproducing unit 450 reproduces the 2D image generated from the first image data stored in the storage unit 440, and the 3D stereoscopic image is synthesized from the second image data and third image data stored in the storage unit 440 in accordance with the identification information. Then, the display unit 460 displays the reproduced 2D image and 3D stereoscopic image. The display unit 460 may employ a barrier liquid crystal display (LCD). In an exemplary embodiment, the barrier LCD is turned off if the fragment of the image file is a 2D image, and the barrier LCD is turned on if the fragment of the image file is a 3D stereoscopic image so that the image can be displayed properly.

Next, an exemplary method for generating and reproducing an image file by using the data structures of the image file in accordance with the present invention will be described.

Figure 5:
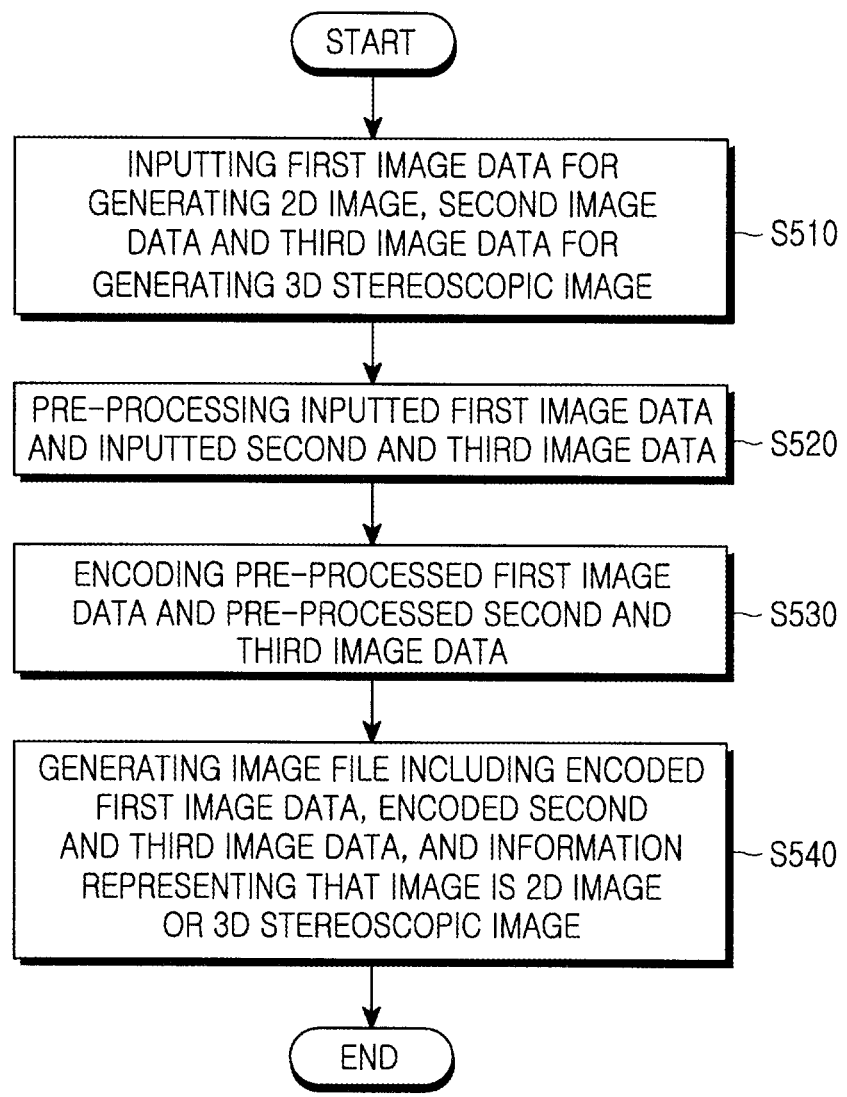
FIG. 5 is a flowchart illustrating a method for generating an image file according to an exemplary embodiment of the present invention.

FIG. 5 is a flowchart illustrating a method for generating an image file according to an exemplary embodiment of the present invention. As shown in FIG. 5, the method includes an inputting step S510, a pre-processing step S520, an encoding step S530, and a file generating step S540.

In step S510, a first image data for generating a 2D image, and second image data and third image data for generating a 3D stereoscopic image are input. For example, a subject is photographed from a left view and/or a right view and the second image data and third image data are output. In step S520, the first image data, the second image data, and the third image data input in step S510 are pre-processed, and the image data generated by the CCD or CMOS-type sensor are converted from analog values to digital values. In step S530, the pre-processed first image data, the second image data, and the third image data are encoded according to a predetermined encoding scheme. Step S530 may be skipped as occasion demands. In step S540, the image file is generated by using the first image data, the second image data, and the third image data encoded in the encoding unit 350. In this case, the image file may be generated according to any one of the data structures of the image file described in FIGS. 2A to 2H.

Figure 6:
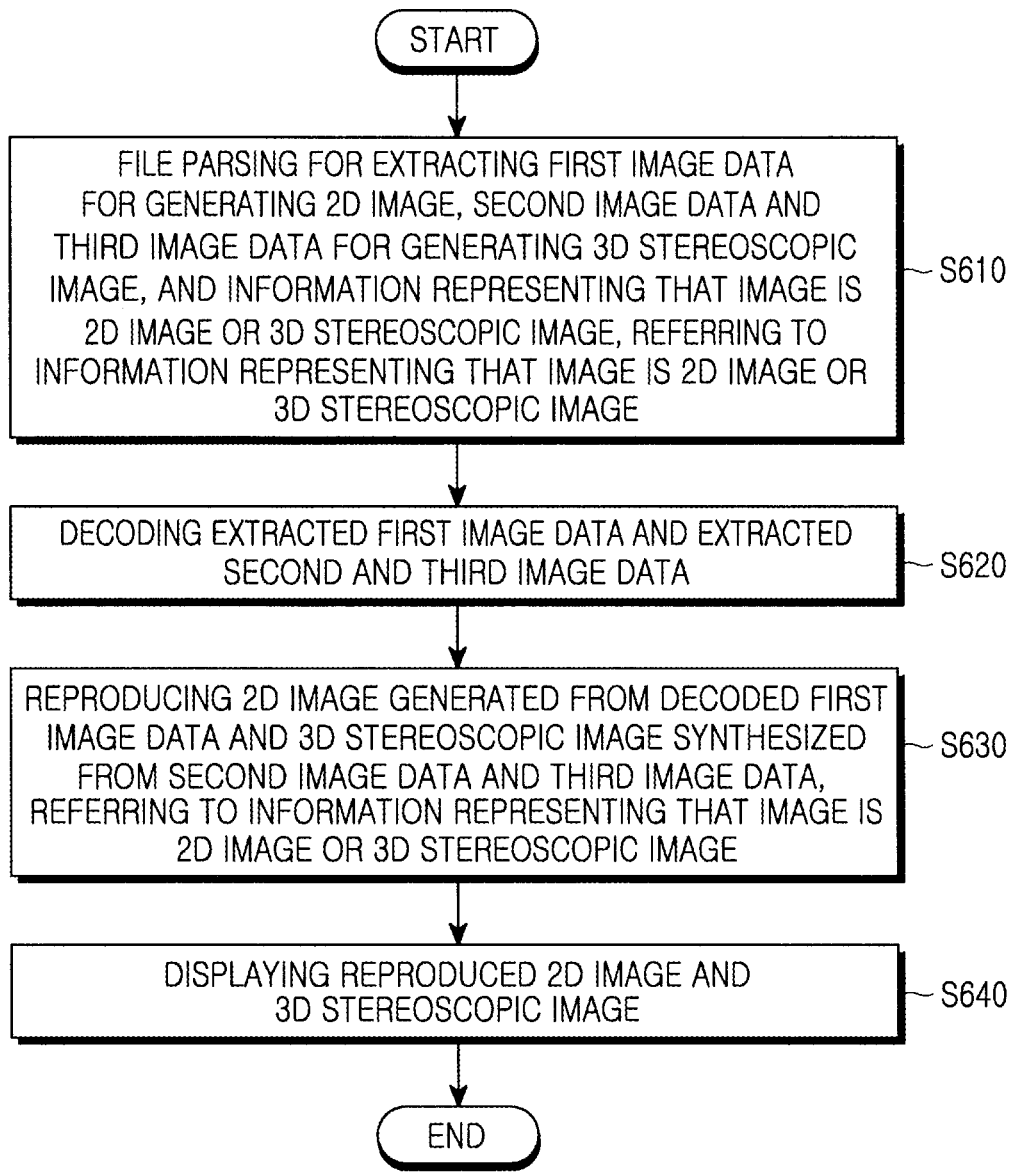
FIG. 6 is a flowchart illustrating a method for reproducing an image file according to an exemplary embodiment of the present invention.

FIG. 6 is a flowchart illustrating a method for reproducing an image file in accordance with an exemplary embodiment of the present invention. As shown in FIG. 6, a method for reproducing the image file includes a file parsing step S610, a decoding step S620, a reproducing step S630, and a display step S640.

In step S610, a first image data, a second image data, and a third image data are extracted by using information stored in a moov area and a metadata area of an image file generated in accordance with the present invention. In particular, the image data are extracted using the identification information described above. In step S620, the first image data, the second image data, and the third image data are decoded. If an encoding step was skipped in generating the image file, the decoding step S620 is also skipped. In step S630, the first image data, the second image data, and the third image data decoded in step S620 are synthesized into a 2D image and a 3D stereoscopic image to be reproduced. Then, in step S640, the 2D image and the 3D stereoscopic image generated in step S630 are displayed on the display unit 460. Again, the display unit 460 may employ a barrier LCD where the barrier LCD is turned off if the fragment of the image file is a 2D image, and the barrier LCD is turned on if the fragment of the image file is a 3D stereoscopic image so that the image can be properly displayed.

FIGS. 7 to 10 illustrate operation of a terminal from parsing to reproducing an image file according to various exemplary embodiments of the present invention.

Figure 7:
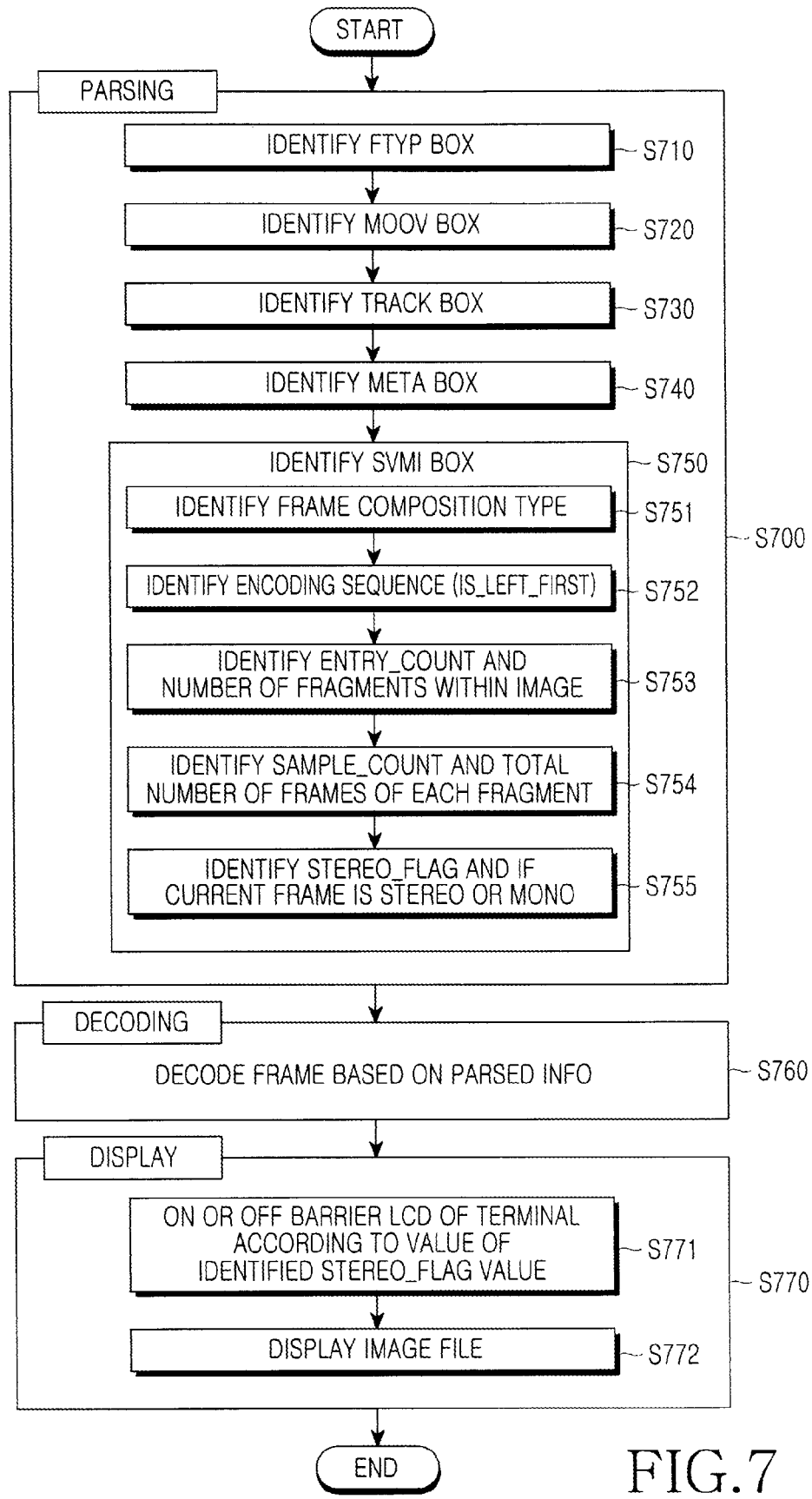
FIG. 7 is a flowchart illustrating a method for reproducing an image file according to another exemplary embodiment of the present invention.

FIG. 7 describes an exemplary embodiment that includes parsing and reproducing an image file generated in accordance with the present invention. The embodiment of FIG. 7 relates to an image file format including an image information box (e.g., "svmi" box) shown in Table 3. The image information box (e.g., "svmi" box) includes a plurality of fields. A main function of the fields is to provide information indicating whether each frame of the image file is a 2D image or a 3D stereoscopic image, the information providing a flag value to control the activation or non-activation of a display (e.g., LCD).

As shown in FIG. 7, file box (e.g., "ftyp" box) in an image file is parsed in step S710. In an exemplary embodiment, the ftyp box is provided according to a conventional ISO/IEC 14496-12 standard. In steps S720 to S740, respectively, a moov box, a track box, and a meta box of the image file are parsed. In an exemplary embodiment, the moov box and the track box may also be provided according to the conventional ISO/IEC 14496-12 standard. In step S750, each field of the image information box (e.g., "svmi" box) of the image file in accordance with the present invention is parsed to determine if each frame within the image track contains a 2D image or a 3D stereoscopic image. The information is mainly provided through the field of the sample_count and the entry_count.

Here, the entry_count refers to the number of fragments within the image file. For example, 6 image may be stored in the image file in the following sequence: a 3D stereoscopic image (1), a 3D stereoscopic image (2), a 3D stereoscopic image (3), a 2D image (1), a 2D image (2), and another 3D stereoscopic image (4). In this example, each of the images is referred to as a fragment. However, it is to be understood that a unit of the fragment can be a frame, a set of frames having a sequential value, or an interval by which a 3D stereoscopic image and a 2D image is divided. The sample_count refers to the number of sequential frames included in each fragment.

Accordingly, the entry_count is identified to determine the number of fragments within the image, and the sample_count is identified to determine the total number of frames included in each fragment. Then, the stereo_flag is identified and flag information of the set of the frames included in the current frame, i.e. the corresponding fragment, is identified. Through the flag information, whether the corresponding fragment is a 3D stereoscopic image or a 2D image may be determined. Then, each identified frame is decoded in the form of a 3D stereoscopic image or 2D image in step S760.

In step S770, according to the parsed information of the stereo_flag within the image information box (e.g., "svmi" box), a barrier LCD is controlled such that if the value is "1," the barrier LCD is activated, and if the value is "0," the barrier LCD is not activated. That is, in the case of a 3D stereoscopic image, the value of the stereo_flag may be set as "1" so that the barrier LCD is activated so, and in the case of a 2D image, the value of the stereo_flag may be set as "0" so that the barrier LCD is not activated, thereby allowing the barrier LCD to be controlled. In the meantime, the decoded frame is reproduced and displayed on the activated or non-activated barrier LCD so that the user can see the image.

Figure 8:
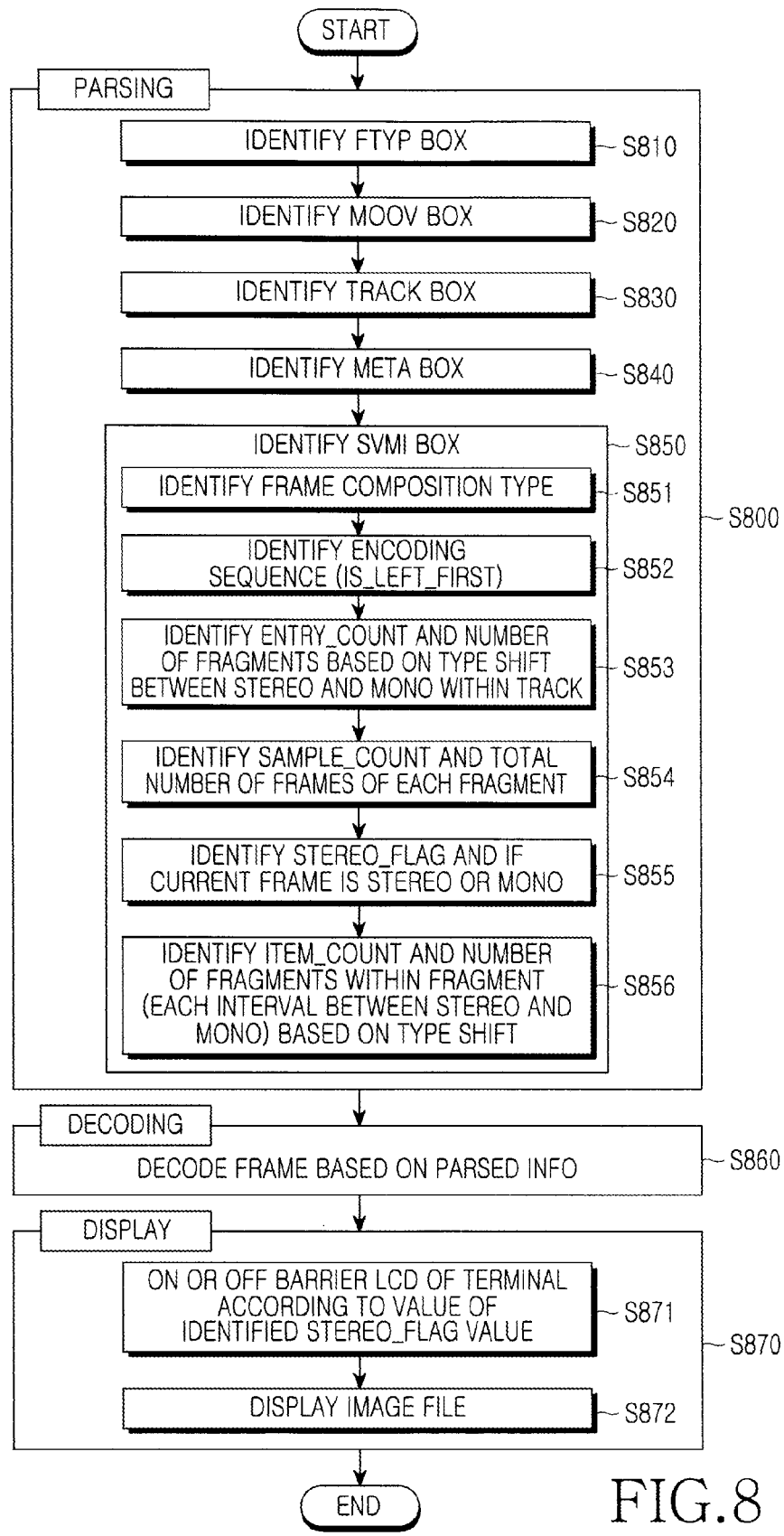
FIG. 8 is a flowchart illustrating a method for reproducing an image file according to another exemplary embodiment of the present invention.

FIG. 8 is a flowchart illustrating a method for reproducing an image file according to another exemplary embodiment of the present invention. As shown in FIG. 8, file box (e.g., "ftyp" box) of the image file is parsed in step S810. Then, moov box, track box, and meta box of the image file are parsed in steps S820, S830, and S840, respectively. Next, each field of the image information box (e.g., "svmi" box) of the image file in accordance with the present invention is parsed to determine if each frame within the image track contains a 2D image or a 3D stereoscopic image in step S850.

The entry_count in the present exemplary embodiment is different from that of the previous exemplary embodiment. The entry_count in the present exemplary embodiment refers to the number of fragments in which the type of the fragment (i.e., 2D or 3D) is shifted from stereo-to-mono or from mono-to-stereo. Using the previous image file example, even if 6 images of the 3D stereoscopic image (1), the 3D stereoscopic image (2), the 3D stereoscopic image (3), the 2D image (1), the 2D image (2), and the 3D stereoscopic image (4) are included in a single image file in sequence, the image is divided based on the type shift of the 3D stereoscopic image and 2D image. Accordingly, the entry_count is 3 (i.e., 3D image fragments (1)-(3), 2D image fragments (1)-(2), and 3D image fragment (4)). The entry_count is identified to determine the number of fragments within the image, and the sample_count is identified to determine the total number of frames included in each fragment. Then, the stereo_flag is identified and the flag information on the set of the frames included in the current frame, i.e. the corresponding fragment, is identified. Through the flag information, whether the corresponding fragment is the 3D stereoscopic image or 2D image may be determined. Next, the item_count is identified so as to identify the number of fragments within each entry (within each interval of stereo and mono) of the image identified in the entry_count. A unit of the fragment can be a frame, a set of frames having sequential values, or an interval by which the 3D stereoscopic image and 2D image is divided. The steps of decoding and displaying the image (steps S860 and S870) are identical to the operation of the terminal of the previous exemplary embodiment shown in FIG. 7.

Figure 9:
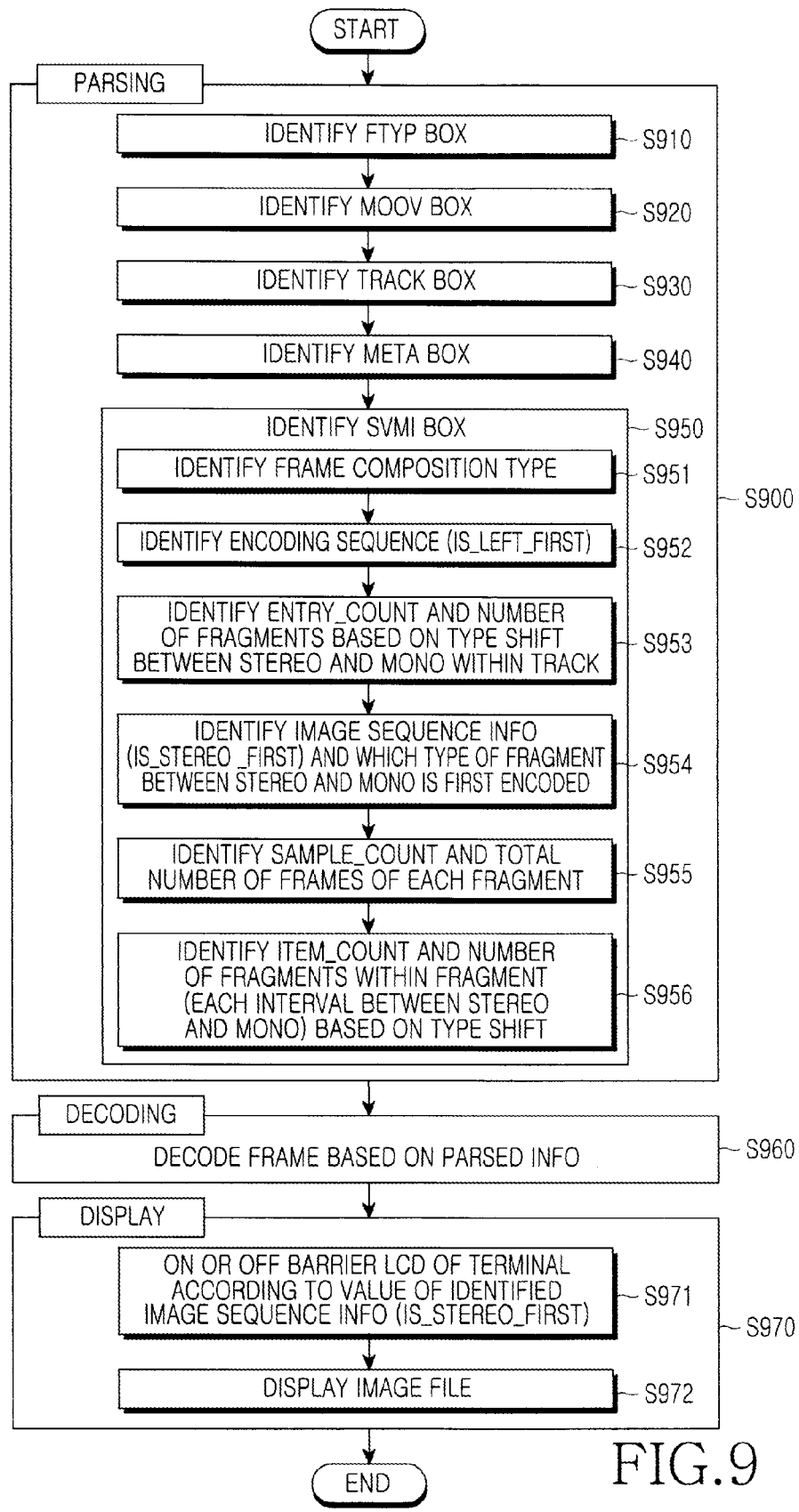
FIG. 9 is a flowchart illustrating a method for reproducing an image file according to another exemplary embodiment of the present invention.

FIG. 9 illustrates a method for parsing and reproducing an image file according to another exemplary embodiment of the present invention. As shown in FIG. 9, file box (e.g., "ftyp" box) is parsed in the image file in step S910. Then, moov box, track box, and meta box of the image file are parsed in steps S920, S930, and S940, respectively. Next, each field of the image information box (e.g., "svmi" box) of image file in accordance with the present invention is parsed to determine if each frame within the image track contains a 2D image or a 3D stereoscopic image in step S950.

The entry_count in the present exemplary embodiment is the same as that of the exemplary embodiment of FIG. 8. That is, the entry_count in this exemplary embodiment also refers to the number of fragments in which the type of the fragment is shifted from stereo-to-mono or from mono-to-stereo. The entry_count is identified, the number of fragments within the image is identified, and the encoding sequence (is_left_first) is identified, so as to identify which image interval between the 3D stereoscopic image and 2D image is first constructed in the corresponding image. For example, the value of the encoding sequence (is_left_first) may be set to "1" to indicate that the contents are arranged in S→M→S→M sequence, and the value may be set to "0" to indicate that the contents are arranged in M→S→M→S sequence. Then, the sample_count is identified to determine the total number of frames included in each fragment. Next, the item_count is identified so as to identify the number of fragments within each entry (within each interval between stereo and mono) of the image identified from the entry_count. A unit of the fragment can be a frame, a set of frames having sequential values, or an interval by which the 3D stereoscopic image and 2D image is divided. Then, each identified frame is decoded as a 3D stereoscopic image or a 2D image in step S960. Next, the barrier LCD is controlled with the information obtained through parsing the encoding sequence (is_stereo_first) within the image information box. The encoded frame is reproduced and displayed on the activated or non-activated barrier LCD so as to allow the user to watch the image in step S970.

Figure 10:
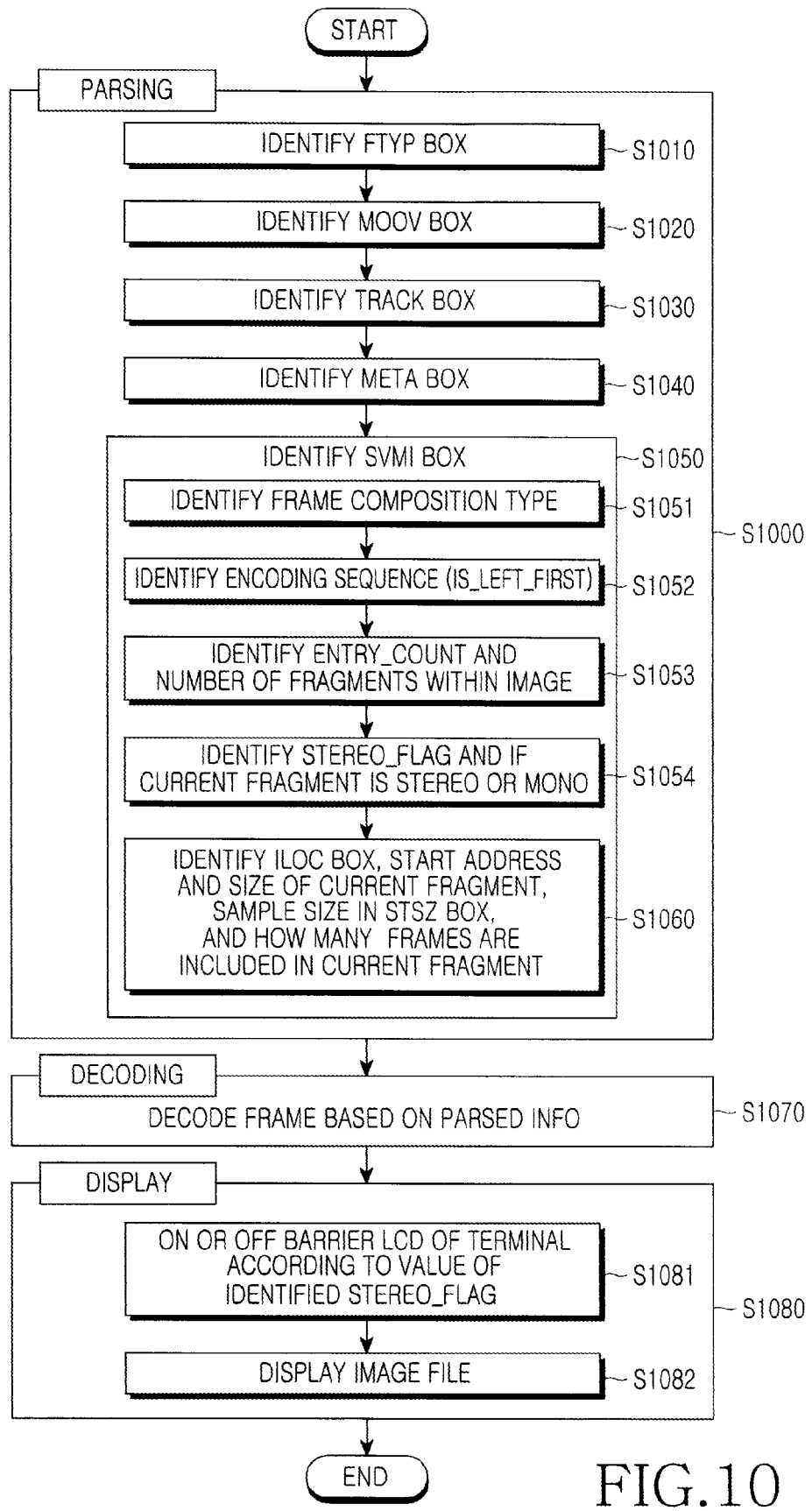
FIG. 10 is a flowchart illustrating a method for reproducing an image file according to another exemplary embodiment of the present invention.

FIG. 10 is a flowchart illustrating a method for reproducing an image file according to another exemplary embodiment of the present invention. As shown in FIG. 10, file box (e.g., "ftyp" box) in the image file is parsed in step S1010. Then, moov box, track box, and meta box of the image file are parsed in steps S1010, S1020, and S1030, respectively. Next, each field of the image information box (e.g., "svmi" box) of the image file in accordance with the present invention is parsed to determine if each frame within the image track contains a 2D image or a 3D stereoscopic image in step S1050.

The entry_count in the current exemplary embodiment is the same as that of the exemplary embodiment of FIG. 7 in which it refers to the number of fragments within the image file. Using the previous image file example, even if 6 images of the 3D stereoscopic image (1), the 3D stereoscopic image (2), the 3D stereoscopic image (3), the 2D image (1), the 2D image (2), and the 3D stereoscopic image (4) are included in a single image file in sequence, each image includes a plurality of frames, in which each image is referred as the fragment. As described above, a unit of a fragment can be a frame, a set of frames having sequential values, or an interval by which the 3D stereoscopic image and 2D image is divided. The sample_count refers to the number of sequential frames included in each fragment. The entry_count is identified to determine the number of fragments within the image, and the stereo_flag is identified and the flag information of the set of the frames included in each fragment is identified. Through the flag information, whether the corresponding fragment is the 3D stereoscopic image or 2D image may be determined. Then, the item location box (e.g., "iloc" box) is identified, the start address and the size of the fragment are identified, and the sample size in the sample size box (e.g., "stsz" box) is identified, so as to identify how many frames are included in each fragment in step S1060. The steps of decoding and displaying the image (steps S1070 and S1080) are identical to the operation of the terminal of the first exemplary embodiment shown in FIG. 7.

Figure 11:
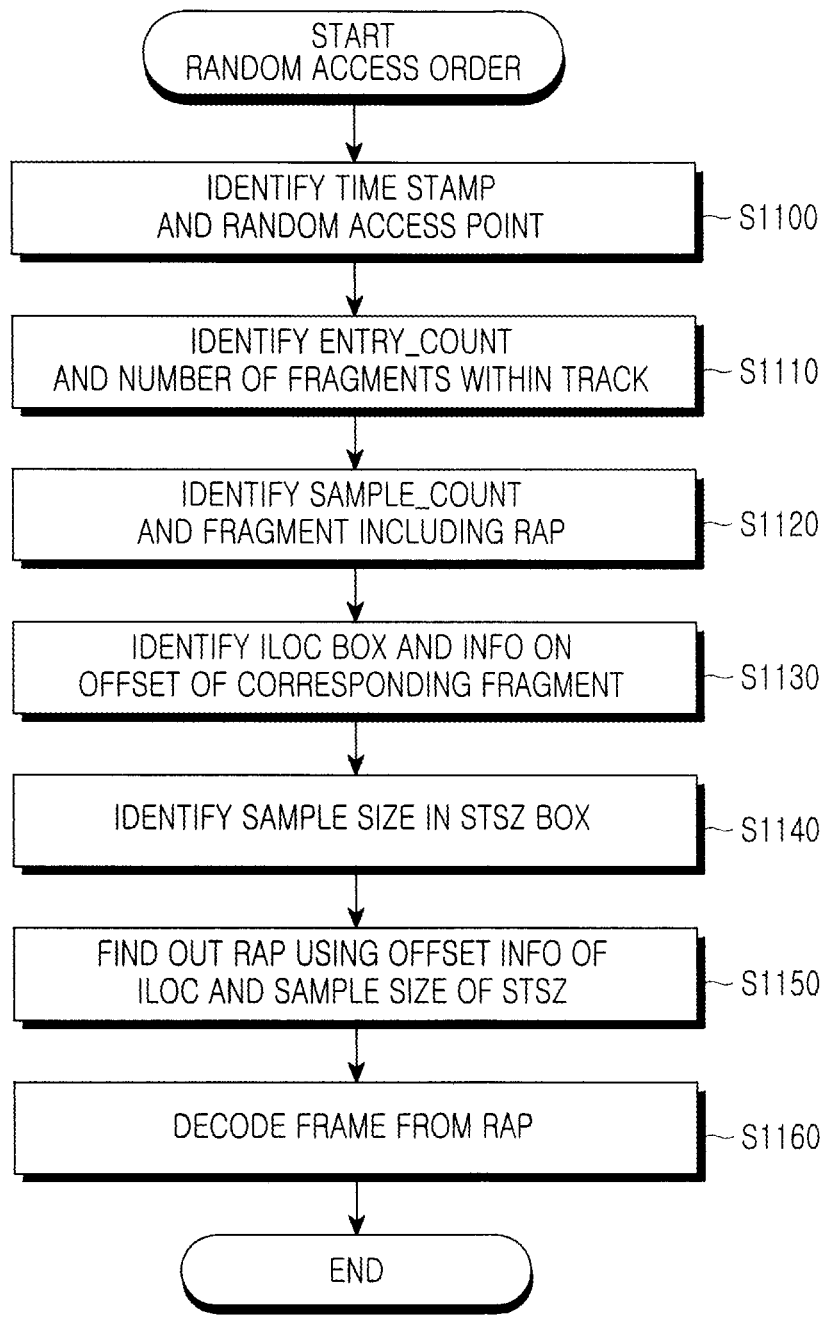
FIG. 11 is a flowchart illustrating a method for implementing random access according to the present invention.

FIG. 11 is a flowchart illustrating a method for implementing random access of an image file according to the present invention. FIG. 11 illustrates the operation of a terminal where a random access order is generated during decoding and reproducing an image, such as when a play bar is shifted to an image of a time zone desired to be watched during reproducing a one-hour image, for example.

In step S1100, time stamp information is identified from a box including the time stamp (e.g., "TimeStamp") information so as to identify the frame to be random-accessed (i.e., a random access point, hereinafter referred to as "RAP"). In step S1110, the entry_count of the image information box (e.g., "svmi" box) is identified and the number of fragments within the image is identified. At this time, a unit of the fragment can be a frame, a set of frames having sequential values, or an interval by which a 3D stereoscopic image and a 2D image is divided. In steps S1120 and S1130, respectively, the sample_count is identified, the fragment including the RAP is identified, and the item location box (e.g., "iloc" box) is identified, so as to identify the start address of the corresponding fragment through the information, such as offset of the corresponding fragment. In steps S1140 and S1150, respectively, the sample_size is identified in the sample size box (e.g., "stsz" box) and the sample_size is added one-by-one from the start address of the corresponding fragment identified in the item location box (e.g., "iloc" box) so as to find out the RAP. Then, decoding of the RAP is started according to the random access order in step S1160. If the random access order is generated, a conventional method determines the RAP through calculating the sample_size of the entire image. However, according to the present invention, only the sample within the fragment including the RAP need be calculated.

FIG. 11 illustrates only an exemplary embodiment using the entry_count and sample_count. However, it is to be understood that the random access operation of the present invention may be applied to other exemplary embodiments. Further, steps for identifying the item_count, or the like, may be added or excluded depending on the exemplary embodiment within the scope of the logical flow in the operation of a terminal without departing from the scope of the present invention. Still further, details of interpreting the image information box (e.g., "svmi" box) or the operation of a terminal may be varied depending on the location of the image information box, the location of the parameter within the box, or the like, without departing from the scope of the present invention.

Details of the steps for parsing the file format and the operation of the terminal which are not specifically described here may be implemented based on ISO/IEC 14496-12 and ISO/IEC 23000-11 standards and may be used in conjunction with the various embodiments of the present invention.

As described above, the present invention defines a data structure of an image file that can include both 2D image and 3D stereoscopic image by using verified standard technology of 2D images so as to simply the verification process serving as a new standard. Accordingly, the present invention allows both 2D image and 3D stereoscopic image to be implemented within a single image file as necessary. In particular, the system and method for using the image file format according to the present invention allows images not required to be viewed in the form of the 3D stereoscopic image (i.e., 2D images within an image file for displaying 3D stereoscopic image) to be displayed according so as to release eyestrain of the user. Further, the present invention has an advantage in that the contents mixed with 3D stereoscopic image and 2D image can be effectively reproduced by controlling the barrier LCD of the terminal on or off using the image information box (e.g., "svmi" box).

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A non-transitory computer readable medium storing instructions that, when executed by a computer, perform a method comprising:

receiving an image file;

parsing a media data field of the image file including one or more image data samples;

parsing a media header field including an image type data field including a flag field indicating whether each of the one or more image data samples is one of 2 dimensional (2D) image data and 3 dimensional (3D) stereoscopic image data; and generating an image corresponding to one of a 2D image and a 3D stereoscopic image based on the image type data field of the image file, wherein the image type data field further includes a first count field indicating a numerical count of the image data samples of the same type in sequence, and wherein the image type data field further includes a second count field indicating a number of fragments in which a type of the fragment is changed from stereoscopic to monoscopic or from monoscopic to stereoscopic, the fragment being a set of the image data samples.

2. The non-transitory computer readable medium of claim 1, wherein the media header field includes a track field, the track field includes a track-level metadata field, and the image type data field is located in the track-level metadata field.

3. The non-transitory computer readable medium of claim 1, wherein two of the plurality of the 3D stereoscopic image data samples represent a frame, such that each frame consists of the left view image and the right view image arranged in a side-by-side manner.

4. The non-transmitory computer readable medium of claim 1, wherein the stereoscopic composition type includes at least one of side-by-side, vertical line interleaved, frame sequential, monoscopic left image, and monoscopic right image.

5. The non-transitory computer readable medium of claim 1, wherein the image type data field further includes a stereoscopic composition type field indicating a stereoscopic composition type as a stereoscopic visual type of stereoscopic content included in the image file.

6. A computer-implemented method, comprising:
receiving an image file;
parsing a media data field of the image file including one or more image data samples;
parsing a media header field including an image type data field including a flag field indicating whether each of the one or more image data samples is one of 2 dimensional (2D) image data and 3 dimensional (3D) stereoscopic image data; and
generating an image corresponding to one of a 2D image and a 3D stereoscopic image based on the image type data field of the image file,
wherein the image type data field further includes a first count field indicating a numerical count of the image data samples of the same type in sequence, and
wherein the image type data field further includes a second count field indicating a number of fragments in which a type of the fragment is changed from stereoscopic to monoscopic or from monoscopic to stereoscopic, the fragment being a set of the image data values.

7. The computer-implemented method of claim 6, wherein the media header field includes a track field, the track field includes a track-level metadata field, and the image type data field is located in the track-level metadata field.

8. The computer-implemented method of claim 6 further comprising:
controlling a barrier liquid crystal display (LCD) based on the flag to turn on if the flag is set as 3D stereoscopic image data and to turn off if the flag is set as 2D image data.

9. The computer-implemented method of claim 6, wherein two of the plurality of the 3D stereoscopic image data samples represent a frame, such that each frame consists of the left view image and the right view image arranged in a side-by-side manner.

10. The computer-implemented method of claim 6, wherein the stereoscopic composition type includes at least one of side-by-side, vertical line interleaved, frame sequential, monoscopic left image, and monoscopic right image.

11. The computer-implemented method of claim 6, wherein the image type data field further includes a stereoscopic composition type field indicating a stereoscopic composition type as a stereoscopic visual type of stereoscopic content included in the image file.

12. An apparatus, comprising:
a storage unit configured to receive and store an image file;
a processor configured to parse a media data field of the image file including one or more image data samples and to parse a media header field including an image type data field including a flag field indicating whether each of the one or more image data samples is one of 2 dimensional (2D) image data and 3 dimensional (3D) stereoscopic image data to generate an image corresponding to one of a 2D image and a 3D stereoscopic image based on the image type data field of the image file; and
a display unit configured to display the generated image according to the image type data field of the image file,
wherein the image type data field further includes a first count field indicating a numerical count of the image data samples of the same type in sequence, and
wherein the image type data field further includes a second count field indicating a number of fragments in which a type of the fragment is changed from stereoscopic to monoscopic or from monoscopic to stereoscopic, the fragment being a set of the image data samples.

13. The apparatus of claim 12, wherein the display unit includes a barrier liquid crystal display (LCD), and the processor controls the display unit based on the flag to turn on the barrier LCD if the flag is set as 3D stereoscopic image data and to turn off the barrier LCD if the flag is set as 2D image data.

14. The apparatus of claim 12, wherein the stereoscopic composition type includes at least one of side-by-side, vertical line interleaved, frame sequential, monoscopic left image, and monoscopic right image.

15. The apparatus of claim 12, wherein the image type data field further includes a stereoscopic composition type field indicating a stereoscopic composition type as a stereoscopic visual type of stereoscopic content included in the image file.

* * * * *